United States Patent
Yoshida et al.

(10) Patent No.: US 10,017,619 B2
(45) Date of Patent: Jul. 10, 2018

(54) POLYPROPYLENE RESIN FOAMED PARTICLES AND METHOD FOR PRODUCING SAME

(71) Applicant: Kaneka Corporation, Osaka (JP)

(72) Inventors: Toru Yoshida, Osaka (JP); Shintaro Miura, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 15/695,293

(22) Filed: Sep. 5, 2017

(65) Prior Publication Data

US 2017/0369669 A1    Dec. 28, 2017

Related U.S. Application Data

(63) Continuation of application No. PCT/JP2016/056866, filed on Mar. 4, 2016.

(30) Foreign Application Priority Data

Mar. 13, 2015    (JP) .................................. 2015-051400

(51) Int. Cl.
| | |
|---|---|
| C08J 9/16 | (2006.01) |
| C08J 9/20 | (2006.01) |
| C08J 9/232 | (2006.01) |

(52) U.S. Cl.
CPC ............. *C08J 9/16* (2013.01); *C08J 2323/14* (2013.01); *C08J 2423/14* (2013.01)

(58) Field of Classification Search
CPC combination set(s) only.
See application file for complete search history.

(56) References Cited

U.S. PATENT DOCUMENTS

| | | |
|---|---|---|
| 2002/0198270 A1 | 12/2002 | Yanagihara et al. |
| 2005/0167870 A1* | 8/2005 | Yanagihara ......... B29C 44/3453 264/51 |

(Continued)

FOREIGN PATENT DOCUMENTS

| | | |
|---|---|---|
| CN | 103509203 A | 1/2014 |
| JP | H10-045939 A | 2/1998 |

(Continued)

OTHER PUBLICATIONS

International Preliminary Report on Patentability issued in International Application No. PCT/JP2016/056866, dated Sep. 28, 2017 (6 pages).
International Search Report issued in International Application No. PCT/JP2016/056866, dated May 17, 2016 (2 pages).

*Primary Examiner* — Kara B Boyle
(74) *Attorney, Agent, or Firm* — Osha Liang LLP

(57) ABSTRACT

Expanded polypropylene resin particles include a polypropylene resin as a base material resin, wherein the polypropylene resin has a flexural modulus of 750 MPa to 1100 MPa. The flexural modulus and a melting point of the expanded polypropylene resin particles satisfy Expression (1): [Flexural modulus (MPa)]<31.19×[Melting point (° C.)]−3500, wherein the melting point of the expanded polypropylene resin particles is a melting point of 141.5° C. to 150.0° C. in a second differential scanning calorimetry (DSC) curve of a second temperature increase, the second DSC curve being obtained when the expanded polypropylene resin particles are heated from 40° C. to 220° C. at a temperature increase rate of 10° C./min in a first temperature increase, then cooled from 220° C. to 40° C. at a temperature decrease rate of 10° C./min, and heated again from 40° C. to 220° C. at a temperature increase rate of 10° C./min in the second temperature increase.

18 Claims, 1 Drawing Sheet

(56) References Cited

U.S. PATENT DOCUMENTS

| | | |
|---|---|---|
| 2008/0039588 A1 | 2/2008 | Shibata et al. |
| 2009/0156700 A1 | 6/2009 | Oikawa et al. |
| 2010/0105787 A1 | 4/2010 | Sasaki et al. |
| 2010/0137466 A1 | 6/2010 | Sasaki et al. |
| 2013/0310476 A1* | 11/2013 | Senda ................ C08J 9/232 521/144 |
| 2015/0284526 A1 | 10/2015 | Yoshida |

FOREIGN PATENT DOCUMENTS

| | | | |
|---|---|---|---|
| JP | 2003-082148 A | | 3/2003 |
| JP | 2005-298769 A | | 10/2005 |
| JP | 2007-320275 A | | 12/2007 |
| JP | 2008-106150 A | | 5/2008 |
| JP | 2009-144096 A | | 7/2009 |
| JP | 2009-280783 A | | 12/2009 |
| JP | 2009280783 A | * | 12/2009 |
| JP | 2010-144078 A | | 7/2010 |
| JP | 2010248341 A | | 11/2010 |
| JP | 2012-233182 A | | 11/2012 |
| JP | 2012233182 A | * | 11/2012 |
| JP | 2013-155386 A | | 8/2013 |
| WO | 2003/097728 A1 | | 11/2003 |
| WO | 2006/054727 A1 | | 5/2006 |
| WO | 2008139822 A1 | | 11/2008 |
| WO | 2009/001626 A1 | | 12/2008 |
| WO | 2009/051035 A1 | | 4/2009 |
| WO | 2012/105608 A1 | | 8/2012 |
| WO | 2014/084165 A1 | | 6/2014 |

\* cited by examiner

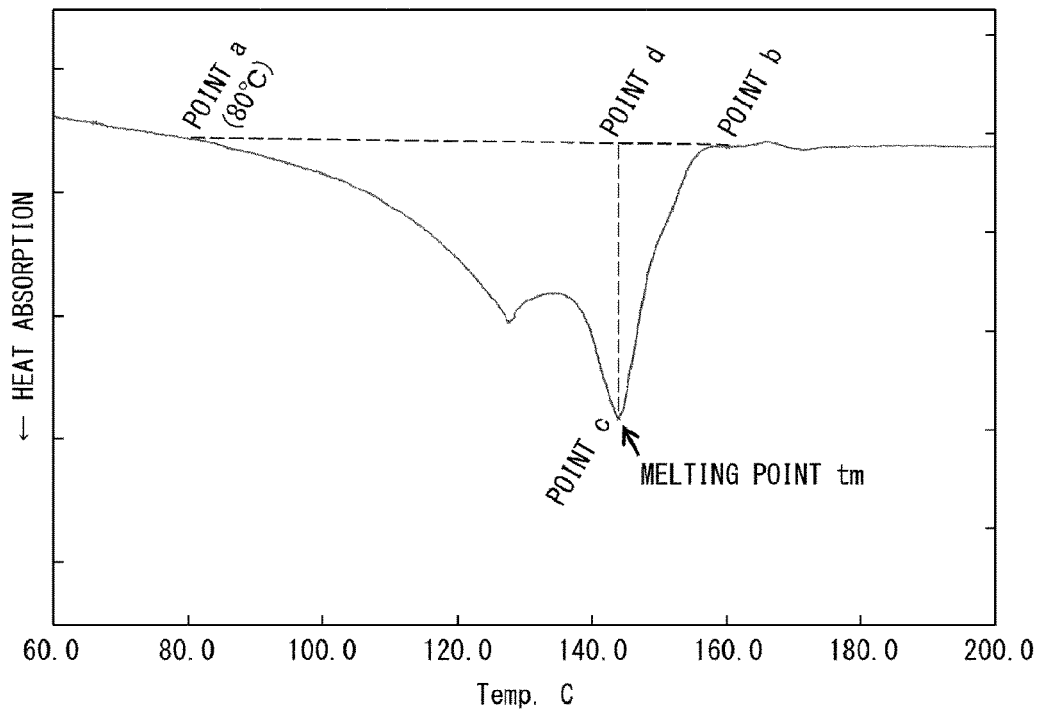
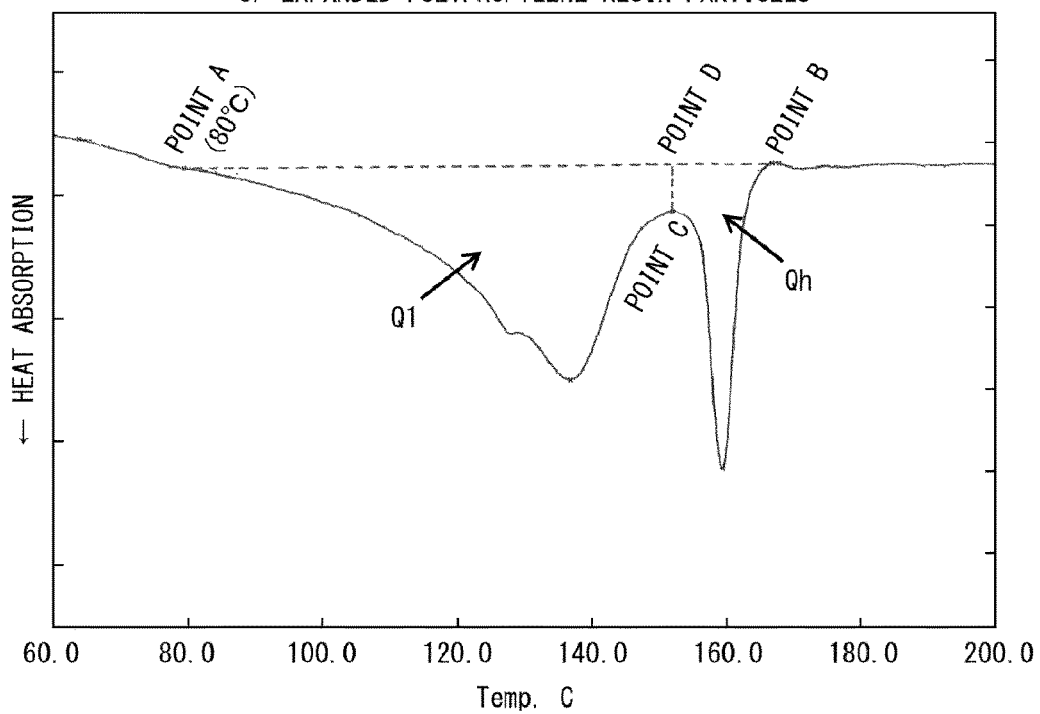

POLYPROPYLENE RESIN FOAMED PARTICLES AND METHOD FOR PRODUCING SAME

TECHNICAL FIELD

One or more embodiments of the present invention relate to (i) expanded polypropylene resin particles and (ii) a method for producing the expanded polypropylene resin particles.

BACKGROUND

A polypropylene resin in-mold expanded molded product, which is obtained using expanded polypropylene resin particles containing a polypropylene resin, has characteristics of, for example, being formed in any shape, being light in weight, and being heat insulating, which characteristics are advantages of an in-mold expanded molded product.

In comparison with a polystyrene resin in-mold expanded molded product which is obtained by use of expanded polystyrene resin particles, a polypropylene resin in-mold expanded molded product is superior in, for example, chemical resistance, heat resistance, and strain recovery rate after compression. In comparison with a polyethylene resin in-mold expanded molded product which is obtained using expanded polyethylene resin particles, a polypropylene resin in-mold expanded molded product is superior in, for example, dimension accuracy, heat resistance, and compressive strength.

A polypropylene resin in-mold expanded molded product, which has the above characteristics, is variously used for, for example, not only automobile interior materials and automobile bumper core materials but also heat insulating materials, shock-absorbing packing materials, and returnable containers.

As described above, a polypropylene resin in-mold expanded molded product is superior to a polyethylene resin in-mold expanded molded product in heat resistance and compressive strength. However, according to a polypropylene resin in-mold expanded molded product, a molding temperature during in-mold foaming molding becomes higher, and a high steam pressure is necessary during, for example, in-mold foaming molding by use of steam. This tends to cause an increase in utility cost.

There have been proposed the following techniques: (i) a technique in which a low-melting polypropylene resin having a melting point of less than 145° C., and further not more than 140° C. is used (e.g., Patent Literature 1 or 2); (ii) a technique in which a mixture of a polypropylene resin having a low melting point and a polypropylene resin having a high melting point is used (e.g., Patent Literatures 3 through 8); (iii) a technique in which a metallocene polypropylene resin having a low melting point and polymerized by use of a metallocene catalyst is used (e.g., Patent Literature 9); and (iv) the like.

However, even in a case where a molding temperature can be reduced by these techniques, in-mold expanded molded products produced by these techniques exhibit a lower compressive strength and a lower surface property of a molded product edge part than conventional in-mold expanded molded products.

Specifically, for example, in a case where a polypropylene resin in-mold expanded molded product for an automobile bumper has a molded product density of 30 g/L, the polypropylene resin in-mold expanded molded product is required to have a strength of approximately 0.23 MPa as a compressive strength when the polypropylene resin in-mold expanded molded product is strained by 50% (hereinafter referred to as "50%-strained compressive strength"). According to a conventional technique, a pressure of not less than 0.26 MPa (gauge pressure) as an in-mold foaming molding pressure (and a high molding temperature) is (are) necessary for obtainment of a polypropylene resin in-mold expanded molded product having the above strength.

Meanwhile, in a case where (i) a polypropylene resin having a low melting point, (ii) a mixture of a polypropylene resin having a low melting point and a polypropylene resin having a high melting point, or (iii) a metallocene polypropylene resin polymerized by use of a metallocene catalyst is used, an in-mold expanded molded product can be molded at an in-mold foaming molding pressure of not more than 0.20 MPa (gauge pressure). However, the in-mold expanded molded product has a 50%-strained compressive strength that is far below 0.23 MPa.

A decrease in compressive strength in the case of use of a polypropylene resin that can be molded at such a low molding pressure (and molding temperature) tends to be significant in a case where a molded product has a molded product density of not more than 40 g/L.

A balance among a low in-mold foaming molding pressure, a high compressive strength, and a good surface property is to be achieved by appropriately regulating a melting point of a polypropylene resin so as to increase a 50%-strained compressive strength while keeping an in-mold foaming molding pressure low. However, a molded product edge part has a lower surface property, so that the balance is difficult to achieve well.

A metallocene polypropylene resin has a higher production cost than a Ziegler polypropylene resin polymerized using a Ziegler catalyst. Therefore, even in a case where utility costs of in-mold foaming molding can be reduced as a result of a decrease in molding temperature, material costs are still high. In view of this, the metallocene polypropylene resin is not necessarily industrially advantageous.

Besides the above techniques, there is known a technique for providing expanded polypropylene resin particles which (i) allow an in-mold expanded molded product to be produced at a low heating steam pressure, (ii) cause the in-mold expanded molded product thus produced to have a low shrinkage percentage, and (iii) are highly beautiful in surface appearance (Patent Literature 10). According to the technique, an in-mold expanded molded product that has a low in-mold foaming molding pressure, a low shrinkage percentage, and a good surface property can be obtained by specifying an MFR, a melting point, and a flexural modulus of a polypropylene resin. However, the technique has a restriction under which (i) a polypropylene resin that satisfies an expression defined by "[Flexural modulus (MPa)] ≥31.19×[Melting point (° C.)]−3500" needs to be used as a base material resin and (ii) the melting point needs to be not more than 145° C. Thus, the technique has room for improvement from the viewpoint of efficiently using a base material resin that is not bound by such a restriction.

Under the circumstances, there are still demands for a technique for achieving a high-compressive-strength polypropylene resin in-mold expanded molded product beautiful in surface appearance while reducing a molding temperature during in-mold foaming molding.

CITATION LIST

Patent Literatures

[Patent Literature 1]
Japanese Patent Application Publication, Tokukai, No. 2010-248341 (Publication Date: Nov. 4, 2010)
[Patent Literature 2]
PCT International Publication No. WO2008/139822 (Publication Date: Nov. 20, 2008)
[Patent Literature 3]
PCT International Publication No. WO2009/001626 (Publication Date: Dec. 31, 2008)
[Patent Literature 4]
Japanese Patent Application Publication, Tokukai, No. 2010-144078 (Publication Date: Jul. 1, 2010)
[Patent Literature 5]
Chinese Patent Publication No. CN103509203 (Publication Date: Jan. 15, 2014)
[Patent Literature 6]
PCT International Publication No. WO2006/054727 (Publication Date: May 26, 2006)
[Patent Literature 7]
PCT International Publication No. WO2009/051035 (Publication Date: Apr. 23, 2009)
[Patent Literature 8]
Japanese Patent Application Publication, Tokukai, No. 2008-106150 (Publication Date: May 8, 2008)
[Patent Literature 9]
Japanese Patent Application Publication, Tokukai, No. 2009-144096 (Publication Date: Jul. 2, 2009)
[Patent Literature 10]
Japanese Patent Application Publication, Tokukai, No. 2009-280783 (Publication Date: Dec. 3, 2009)
[Patent Literature 11]
Japanese Patent Application Publication, Tokukai, No. 2012-233182 (Publication Date: Nov. 29, 2012)
[Patent Literature 12]
Japanese Patent Application Publication, Tokukai, No. 2013-155386 (Publication Date: Aug. 15, 2013)
[Patent Literature 13]
Japanese Patent Application Publication, Tokukai, No. 2003-082148 (Publication Date: Mar. 19, 2003)
[Patent Literature 14]
Japanese Patent Application Publication, Tokukaihei, No. 10-045939 (Publication Date: Feb. 17, 1998)
[Patent Literature 15]
Japanese Patent Application Publication, Tokukai, No. 2007-320275 (Publication Date: Dec. 13, 2007)
[Patent Literature 16]
PCT International Publication No. WO2003/097728 (Publication Date: Nov. 27, 2003)
[Patent Literature 17]
Japanese Patent Application Publication, Tokukai, No. 2005-298769 (Publication Date: Oct. 27, 2005)

SUMMARY

One or more embodiments of the present invention provide expanded polypropylene resin particles from which a polypropylene resin in-mold expanded molded product having a high compressive strength and an excellent surface properties can be produced while a molding temperature (steam pressure) during in-mold foaming molding is reduced.

The inventors have found that expanded polypropylene resin particles which are obtained by using, as a base material resin, a polypropylene resin having a specific flexural modulus and which have a specific melting point and a specific main endothermic peak in a case where differential scanning calorimetry (DSC) is carried out serve as expanded polypropylene resin particles. In particular, the inventors found that a polypropylene resin which does not satisfy "[Flexural modulus (MPa)]≥31.19×[Melting point (° C.)]−3500" disclosed in Patent Literature 10 may be used as a base material resin and also allows a resin whose melting point exceeds 145° C. to be used.

For example, the following are one or more embodiments of the present invention.

[1] Expanded polypropylene resin particles containing:
a polypropylene resin as a base material resin,
the polypropylene resin having a flexural modulus of not less than 750 MPa and not more than 1100 MPa, and having the flexural modulus and a melting point which satisfy the following Expression (1):

$$[\text{Flexural modulus (MPa)}] < 31.19 \times [\text{Melting point (° C.)}] - 3500 \qquad \text{Expression (1)}$$

where Melting point in Expression (1) is a melting point in the following condition (a), and
the expanded polypropylene resin particles meeting all the following conditions (a) through (d):

(a) that the expanded polypropylene resin particles have a melting point of not less than 141.5° C. and not more than 150.0° C. in a DSC curve of a second temperature increase ("second DSC curve"), which DSC curve is obtained by differential scanning calorimetry (DSC) in which the expanded polypropylene resin particles are heated in a first temperature increase from 40° C. to 220° C. at a temperature increase rate of 10° C./min, then cooled from 220° C. to 40° C. at a temperature decrease rate of 10° C./min, and heated again in a second temperature increase from 40° C. to 220° C. at a temperature increase rate of 10° C./min;

(b) that in the DSC curve of the second temperature increase, the expanded polypropylene resin particles have a second high temperature melting heat quantity ratio [(j/J)×100(%)], which is a ratio of (A) a melting heat quantity (j) from the melting point to a melting end temperature to (B) an entire resin melting heat quantity (J), of not less than 15% and less than 20%;

(c) that the expanded polypropylene resin particles have, in a DSC curve of a first temperature increase ("first DSC curve"), which DSC curve is obtained by differential scanning calorimetry (DSC) in which the expanded polypropylene resin particles are heated from 40° C. to 220° C. at a temperature increase rate of 10° C./min, (i) a main endothermic peak having an apex temperature not less than 130.0° C. and not more than 145.0° C. and (ii) at least one endothermic peak on a high temperature side of the main endothermic peak; and (d) that the expanded polypropylene resin particles have, in the DSC curve of the second temperature increase, the melting point which is higher than the apex temperature of the main endothermic peak in the DSC curve of the first temperature increase, and the melting point and the apex temperature of the main endothermic peak differ in temperature by not less than 5.0° C. and not more than 15.0° C.

[2] The expanded polypropylene resin particles as set forth in [1], wherein in the condition (a), the expanded polypropylene resin particles have a melting point of more than 145.0° C. and not more than 150.0° C. in the DSC curve of the second temperature increase.

[3] Expanded polypropylene resin particles containing:
a polypropylene resin as a base material resin,
the polypropylene resin having a flexural modulus of not less than 750 MPa and not more than 1100 MPa, and having the flexural modulus and a melting point which satisfy the following Expression (1):

$$[\text{Flexural modulus (MPa)}] < 31.19 \times [\text{Melting point (° C.)}] - 3500 \quad \text{Expression (1)}$$

where Melting point in Expression (1) is a melting point in the following condition (a), and
the expanded polypropylene resin particles meeting all the following conditions (a) through (c):

(a) that the expanded polypropylene resin particles have a melting point of more than 145.0° C. and not more than 150.0° C. in a DSC curve of a second temperature increase, which DSC curve is obtained by differential scanning calorimetry (DSC) in which the expanded polypropylene resin particles are heated in a first temperature increase from 40° C. to 220° C. at a temperature increase rate of 10° C./min, then cooled from 220° C. to 40° C. at a temperature decrease rate of 10° C./min, and heated again in a second temperature increase from 40° C. to 220° C. at a temperature increase rate of 10° C./min;

(b) that the expanded polypropylene resin particles have, in a DSC curve of a first temperature increase, which DSC curve is obtained by differential scanning calorimetry (DSC) in which the expanded polypropylene resin particles are heated from 40° C. to 220° C. at a temperature increase rate of 10° C./min, (i) a main endothermic peak having an apex temperature not less than 130.0° C. and not more than 145.0° C. and (ii) at least one endothermic peak on a high temperature side of the main endothermic peak; and (c) that the expanded polypropylene resin particles have, in the DSC curve of the second temperature increase, the melting point which is higher than the apex temperature of the main endothermic peak in the DSC curve of the first temperature increase, and the melting point and the apex temperature of the main endothermic peak differ in temperature by not less than 5.0° C. and not more than 15.0° C.

[4] The expanded polypropylene resin particles as set forth in any one of [1] through [3], wherein the melting point and the apex temperature of the main endothermic peak differ in temperature by not less than 5.5° C. and not more than 10.0° C.

[5] The expanded polypropylene resin particles as set forth in [4], wherein the melting point and the apex temperature of the main endothermic peak differ in temperature by not less than 5.5° C. and not more than 8.0° C.

[6] The expanded polypropylene resin particles as set forth in any one of [1] through [5], wherein the apex temperature of the main endothermic peak in the DSC curve of the first temperature increase is not less than 133.0° C. and not more than 142.0° C.

[7] The expanded polypropylene resin particles as set forth in any one of [1] through [6], wherein the melting point in the DSC curve of the second temperature increase is more than 145.0° C. and not more than 148.0° C.

[8] The expanded polypropylene resin particles as set forth in any one of [1] through [7], wherein the polypropylene resin has a flexural modulus of not less than 800 MPa and not more than 1050 MPa.

[9] The expanded polypropylene resin particles as set forth in any one of [1] through [8], wherein the base material resin contains a polyethylene resin in an amount of not less than 1 part by weight and not more than 20 parts by weight with respect to 100 parts by weight of the polypropylene resin.

[10] The expanded polypropylene resin particles as set forth in any one of [1] through [9], wherein the polypropylene resin contains a polypropylene resin A ("first polypropylene resin") having a melting point of not less than 130.0° C. and not more than 140.0° C. and a polypropylene resin B ("second polypropylene resin") having a melting point of not less than 145.0° C. and not more than 165.0° C.

[11] The expanded polypropylene resin particles as set forth in [10], wherein the polypropylene resin contains the polypropylene resin A and the polypropylene resin B so that of a total amount of the polypropylene resin A and the polypropylene resin B, which total amount is 100 weight %, the polypropylene resin A accounts for not less than 50 weight % and not more than 70 weight %, and the polypropylene resin B accounts for not less than 30 weight % and not more than 50 weight %.

[12] The expanded polypropylene resin particles as set forth in any one of [1] through [11], wherein a 1-butene-containing structural unit is present, as a comonomer, in an amount of not less than 1 weight % and not more than 15 weight % with respect to the 100 weight % polypropylene resin.

[13] The expanded polypropylene resin particles as set forth in any one of [1] through [12], wherein a 1-butene-containing structural unit is present, as a comonomer, in an amount of not less than 1.5 weight % and not more than 11 weight % with respect to the 100 weight % polypropylene resin.

[14] A polypropylene resin in-mold expanded molded product obtained by molding expanded polypropylene resin particles mentioned in any one of [1] through [13].

[15] The polypropylene resin in-mold expanded molded product as set forth in [14], wherein:
the polypropylene resin in-mold expanded molded product has a molded product density and a 50%-strained compressive strength which have therebetween a relationship that satisfies the following Expression (2):

$$[50\%\text{-strained compressive strength (MPa)}] \geq 0.0069 \times [\text{Molded product density (g/L)}] + 0.018 \quad \text{Expression (2)}$$

[16] A method for producing expanded polypropylene resin particles, including:
placing polypropylene resin particles, water, and an inorganic gas foaming agent in a pressure-resistant vessel so as to obtain a mixture, the polypropylene resin particles containing a polypropylene resin as a base material resin;
dispersing, in the mixture which is being stirred, the polypropylene resin particles so as to obtain a dispersion liquid;
increasing a temperature and a pressure in the pressure-resistant vessel; and
releasing the dispersion liquid from the pressure-resistant vessel into a pressure region so as to expand the polypropylene resin particles, the pressure region having a pressure lower than an internal pressure of the pressure-resistant vessel,
the polypropylene resin having a flexural modulus of not less than 750 MPa and not more than 1100 MPa, and having the flexural modulus and a melting point which satisfy the following Expression (1):

$$[\text{Flexural modulus (MPa)}] < 31.19 \times [\text{Melting point (° C.)}] - 3500 \quad \text{Expression (1)}$$

where Melting point in Expression (1) is a melting point in the following condition (a), and the expanded polypropylene resin particles meeting all the following conditions (a) through (d):

(a) that the expanded polypropylene resin particles have a melting point of not less than 141.5° C. and not more than 150.0° C. in a DSC curve of a second temperature increase, which DSC curve is obtained by differential scanning calorimetry (DSC) in which the expanded polypropylene resin particles are heated in a first temperature increase from 40° C. to 220° C. at a temperature increase rate of 10° C./min, then cooled from 220° C. to 40° C. at a temperature decrease rate of 10° C./min, and heated again in a second temperature increase from 40° C. to 220° C. at a temperature increase rate of 10° C./min;

(b) that in the DSC curve of the second temperature increase, the expanded polypropylene resin particles have a second high temperature melting heat quantity ratio [(j/J)× 100(%)], which is a ratio of (A) a melting heat quantity (j) from the melting point to a melting end temperature to (B) an entire resin melting heat quantity (J), of not less than 15% and less than 20%;

(c) that the expanded polypropylene resin particles have, in a DSC curve of a first temperature increase, which DSC curve is obtained by differential scanning calorimetry (DSC) in which the expanded polypropylene resin particles are heated from 40° C. to 220° C. at a temperature increase rate of 10° C./min, (i) a main endothermic peak having an apex temperature not less than 130.0° C. and not more than 145.0° C. and (ii) at least one endothermic peak on a high temperature side of the main endothermic peak; and (d) that the expanded polypropylene resin particles have the melting point which is higher than the apex temperature of the main endothermic peak, and the melting point and the apex temperature of the main endothermic peak differ in temperature by not less than 5.0° C. and not more than 15.0° C.

[17] A method for producing expanded polypropylene resin particles, including:

placing polypropylene resin particles, water, and an inorganic gas foaming agent in a pressure-resistant vessel so as to obtain a mixture, the polypropylene resin particles containing a polypropylene resin as a base material resin;

dispersing, in the mixture which is being stirred, the polypropylene resin particles so as to obtain a dispersion liquid;

increasing a temperature and a pressure in the pressure-resistant vessel; and releasing the dispersion liquid from the pressure-resistant vessel into a pressure region so as to expand the polypropylene resin particles, the pressure region having a pressure lower than an internal pressure of the pressure-resistant vessel, the polypropylene resin having a flexural modulus of not less than 750 MPa and not more than 1100 MPa, and having the flexural modulus and a melting point which satisfy the following Expression (1):

[Flexural modulus (MPa)]<31.19×[Melting point (° C.)]−3500    Expression (1)

where Melting point in Expression (1) is a melting point in the following condition (a), and the expanded polypropylene resin particles meeting all the following conditions (a) through (c):

(a) that the expanded polypropylene resin particles have a melting point of more than 145.0° C. and not more than 150.0° C. in a DSC curve of a second temperature increase, which DSC curve is obtained by differential scanning calorimetry (DSC) in which the expanded polypropylene resin particles are heated in a first temperature increase from 40° C. to 220° C. at a temperature increase rate of 10° C./min, then cooled from 220° C. to 40° C. at a temperature decrease rate of 10° C./min, and heated again in a second temperature increase from 40° C. to 220° C. at a temperature increase rate of 10° C./min;

(b) that the expanded polypropylene resin particles have, in a DSC curve of a first temperature increase, which DSC curve is obtained by differential scanning calorimetry (DSC) in which the expanded polypropylene resin particles are heated from 40° C. to 220° C. at a temperature increase rate of 10° C./min, (i) a main endothermic peak having an apex temperature not less than 130.0° C. and not more than 145.0° C. and (ii) at least one endothermic peak on a high temperature side of the main endothermic peak; and (c) that the expanded polypropylene resin particles have the melting point which is higher than the apex temperature of the main endothermic peak, and the melting point and the apex temperature of the main endothermic peak differ in temperature by not less than 5.0° C. and not more than 15.0° C.

[18] The method as set forth in [16] or [17], wherein the dispersion liquid is released, at a temperature that is set at not more than 40° C., from the pressure-resistant vessel into the pressure region, which has the pressure lower than the internal pressure of the pressure-resistant vessel.

[19] A method for producing a polypropylene resin in-mold expanded molded product, including the steps of:

a) filling a mold with expanded polypropylene resin particles obtained by a method mentioned in any one of [16] through [18]; and b) obtaining the polypropylene resin in-mold expanded molded product by heating the expanded polypropylene resin particles, with which the mold is filled.

[20] The method as set forth in [19], wherein:

in the step b), the expanded polypropylene resin particles are heated by use of steam having a pressure of not more than 0.22 MPa (gauge pressure); and the polypropylene resin in-mold expanded molded product has a molded product density and a 50%-strained compressive strength which have therebetween a relationship that satisfies the following Expression (2):

[50%-strained compressive strength (MPa)]≥0.0069× [Molded product density (g/L)]+0.018    Expression (2)

Expanded polypropylene resin particles of one or more embodiments of the present invention make it possible to (i) keep a molding temperature during in-mold foaming molding low, (ii) maintain, at a level not inferior to those of conventional molded products, a compressive strength of a polypropylene resin in-mold expanded molded product to be obtained by in-mold foaming molding, and (iii) produce therefrom a polypropylene resin in-mold expanded molded product excellent in surface property (beautiful in surface appearance).

BRIEF DESCRIPTION OF THE DRAWINGS

FIG. 1 shows an example of a DSC curve of a second temperature increase according to one or more embodiments of the present invention, where the DSC curve is obtained by differential scanning calorimetry (DSC) in which expanded polypropylene resin particles as described herein are heated from 40° C. to 220° C. at a temperature increase rate of 10° C./min, cooled from 220° C. to 40° C. at a rate of 10° C./min, and heated again from 40° C. to 220° C. at a rate of 10° C./min. tm is a melting point. This example relates to expanded polypropylene resin particles containing a base material resin, which is a mixture of a polypropylene resin and a polyethylene resin. In the example, not only a melting peak derived from the polypropylene resin (a high temperature side peak indicative of the melting point tm) but also a melting peak derived from the polyethylene resin (a low temperature side peak) appears.

FIG. 2 shows an example of a DSC curve of a first temperature increase according to one or more embodiments of the present invention, where the DSC curve is obtained by differential scanning calorimetry (DSC) in which expanded polypropylene resin particles according to one or more embodiments of the present invention are heated from 40° C. to 220° C. at a temperature increase rate of 10° C./min. The DSC curve has two melting peaks and two melting heat quantity regions. The two melting peaks are a main endothermic peak and a peak on a high temperature side of the main endothermic peak. The two melting heat quantity regions are a region of a melting heat quantity of the main endothermic peak (Ql) and a region of a melting heat quantity of the peak on the high temperature side of the main endothermic peak (Qh). This example relates to expanded polypropylene resin particles containing a base material resin, which is a mixture of a polypropylene resin and a polyethylene resin. In the example, a small melting peak (shoulder) derived from the polyethylene resin appears on a low temperature side of the main endothermic peak.

DETAILED DESCRIPTION OF THE EMBODIMENTS

Expanded polypropylene resin particles of one or more embodiments of the present invention contain a polypropylene resin as a base material resin.

Examples of the polypropylene resin used in one or more embodiments of the present invention encompass (i) a propylene homopolymer and (ii) a copolymer containing: propylene; and a comonomer copolymerizable with propylene.

The polypropylene resin may be a copolymer containing: propylene; and a comonomer copolymerizable with propylene. This is because such a polypropylene resin easily makes a molding temperature during in-mold foaming molding low.

Examples of such a comonomer copolymerizable with propylene encompass C2 or C4-C12 α-olefins such as ethylene, 1-butene, 1-pentene, 1-hexene, and 4-methyl-1-butene. Of these comonomers, ethylene may be used. These comonomers can be used alone to be copolymerized with propylene, or two or more of these comonomers can be used in combination to be copolymerized with propylene.

The polypropylene resin may be a propylene-ethylene random copolymer, a propylene-1-butene random copolymer, or a propylene-ethylene-1-butene random copolymer. This is because such a polypropylene resin easily makes a molding temperature during in-mold foaming molding low and allows an in-mold expanded molded product to be obtained to have a compressive strength that is maintained at a high level without being reduced.

In one or more embodiments of the present invention, polypropylene resins may be copolymerized with 1-butene. Of these polypropylene resins, a polypropylene resin that contains a 1-butene-containing structural unit in an amount of not less than 1 weight % and not more than 15 weight % in a case where a total weight of the polypropylene resin is 100 weight % may be used. It is also envisioned that a polypropylene resin that contains a 1-butene-containing structural unit in an amount of not less than 1.5 weight % and not more than 11 weight % in a case where a total weight of the polypropylene resin is 100 weight % may be used in one or more embodiments of the present invention.

Note that a comonomer content in the polypropylene resin can be specified by being measured by, for example, a conventionally known IR spectrum measurement method or NMR spectrum measurement method. In a case where a mixture of a plurality of polypropylene resins is used, it is only necessary that the plurality of polypropylene resins which has been mixed be subjected to the measurement by the above measurement method. Note, however, that it is also possible to (i) measure, by the above measurement method, comonomer contents in the respective plurality of polypropylene resins which has not been mixed and (ii) define the comonomer contents as an arithmetic mean value in accordance with a ratio at which the plurality of polypropylene resins is mixed.

The polypropylene resin of one or more embodiments of the present invention has a melting point of not less than 141.5° C. and not more than 150.0° C., or not less than 143.0° C. and not more than 148.0° C., or more than 145.0° C. and not more than 148.0° C. In a case where the polypropylene resin of one or more embodiments of the present invention has a melting point falling within the above range, expanded polypropylene resin particles also easily have a melting point of not less than 141.5° C. and not more than 150.0° C.

The polypropylene resin which has a melting point of less than 141.5° C. tends to cause a decrease in compressive strength of an in-mold expanded molded product to be obtained. Meanwhile, the polypropylene resin which has a melting point of more than 150.0° C. tends to cause an increase in in-mold foaming molding pressure during in-mold foaming molding (tends to cause an increase in molding temperature).

Note here that a melting point of a polypropylene resin refers to a melting peak temperature in a second temperature increase in a DSC curve obtained by differential scanning calorimetry (DSC) in which not less than 1 mg and not more than 10 mg of the polypropylene resin is heated in a first temperature increase from 40° C. to 220° C. at a temperature increase rate of 10° C./min, then cooled from 220° C. to 40° C. at a temperature decrease rate of 10° C./min, and heated again in a second temperature increase from 40° C. to 220° C. at a temperature increase rate of 10° C./min.

As described later, a plurality of melting peaks may appear in a case where a plurality of resins is mixed. Note, however, that mixing of a plurality of resins does not necessarily cause a plurality of melting peaks to appear.

For example, in a case where a polypropylene resin and a polyethylene resin are mixed and greatly differ in melting point, two melting peaks in total, i.e., (i) a melting peak derived from the polypropylene resin and (ii) a melting peak (or shoulder) derived from the polyethylene resin may appear in the DSC curve of the second temperature increase. Note, however, that the melting point of the polypropylene resin of one or more embodiments of the present invention is absolutely a temperature of the melting peak derived from the polypropylene resin.

In contrast, in a case where the polypropylene resin and the polyethylene resin less differ in melting point, a single melting peak may appear. In this case, a temperature of the single melting peak is regarded as the melting point of the polypropylene resin of one or more embodiments of the present invention.

Meanwhile, in a case where a plurality of polypropylene resins is mixed, in the DSC curve of the second temperature increase, a single melting peak may appear, or a plurality of melting peaks may appear. In a case where a plurality of melting peaks appears, a temperature of a melting peak having the greatest heat absorption quantity is employed as the melting point of the polypropylene resin of one or more embodiments of the present invention.

A polypropylene resin can be polymerized by use of a catalyst that is exemplified by but not particularly limited to a Ziegler catalyst, a metallocene catalyst, and the like.

Note, however, that a polypropylene resin polymerized using a Ziegler catalyst generally has lower rigidity commensurate with a melting point than a polypropylene resin polymerized by use of a metallocene catalyst, and therefore is disadvantageous to be used. However, according to a technique of one or more embodiments of the present invention, a polypropylene resin polymerized using a Ziegler catalyst allows effects of one or more embodiments of the present invention to be remarkably exhibited. Thus, in one or more embodiments of the present invention a polypropylene resin polymerized using a Ziegler catalyst may be used. Further, a polypropylene resin polymerized using a Ziegler catalyst may be used because such a polypropylene resin is industrially easily available and widely usable.

The polypropylene resin used in one or more embodiments of the present invention has a melt flow rate (hereinafter referred to as an "MFR") which is not particularly limited but may be more than 3 g/10 min and less than 15 g/10 min, or less than 5 g/10 min and not more than 10 g/10 min.

The polypropylene resin which has an MFR of more than 3 g/10 min and less than 15 g/10 min easily allows an in-mold expanded molded product to have a beautiful surface appearance and also easily allows a molding cycle during molding to be short.

Note here that the MFR of the polypropylene resin of one or more embodiments of the present invention is measured by use of an MFR measuring instrument described in JIS-K7210 and under the following conditions: (i) an orifice having a diameter of 2.0959±0.005 mm and a length of 8.000±0.025 mm; (ii) a load of 2160 g; and (iii) a temperature of 230° C.±0.2° C.

The polypropylene resin used in one or more embodiments of the present invention may have a flexural modulus of not less than 750 MPa and not more than 1100 MPa, or not less than 800 MPa and not more than 1050 MPa. The polypropylene resin which has a flexural modulus of less than 750 MPa tends to cause an in-mold expanded molded product to be obtained to have a lower compressive strength. Meanwhile, the polypropylene resin which has a flexural modulus of more than 1100 MPa tends to increase an in-mold foaming molding pressure during in-mold foaming molding (tends to increase a molding temperature).

Note here that the flexural modulus of the polypropylene resin is a value measured by (i) drying the polypropylene resin at 80° C. for 6 hours, (ii) producing, by use of a 35t injection molding machine and at a cylinder temperature of 200° C. and a mold temperature of 30° C., a bar having a thickness of 6.4 mm (a width of 12 mm and a length of 127 mm), and (iii) carrying out a flexural test with respect to the bar in conformity with ASTM D790 within a week of the production of the bar.

As described later, according to one or more embodiments of the present invention, it is possible to use an additive as necessary in addition to the polypropylene resin. Examples of the additive encompass a resin different from the polypropylene resin, an expansion nucleating agent, a hydrophilic compound, a colorant, an antistatic agent, a flame retarder, an antioxidant, an electrically conductive agent, and the like. In a case where such an additive is used, a mixture of the polypropylene resin and the additive can constitute the base material resin. It is also possible to measure a flexural modulus of such a base material resin of one or more embodiments of the present invention as in the case of the measurement of the flexural modulus of the polypropylene resin, and the flexural modulus of the base material resin is substantially equal to the flexural modulus of the polypropylene resin.

Note that expanded polypropylene resin particles (described later) and a polypropylene resin in-mold expanded molded product (described later) can be returned to a state of an unexpanded resin by, for example, being heated at 180° C. to 220° C. for 5 minutes to 30 minutes (as necessary, being subjected to a degassing operation (e.g., vacuuming) while being heated). It is also possible to measure a flexural modulus of such an unexpanded resin as in the case of the measurement of the flexural modulus of the polypropylene resin, and the flexural modulus of the unexpanded resin is substantially equal to the flexural modulus of the polypropylene resin.

A relationship between (a) the flexural modulus of the polypropylene resin used in one or more embodiments of the present invention and (b) a melting point of the expanded polypropylene resin particles (described later) satisfies the following Expression (1).

$$[\text{Flexural modulus (MPa)}] < 31.19 \times [\text{Melting point (° C.)}] - 3500 \quad \text{Expression (1)}$$

Assuming that the polypropylene resin has [Flexural modulus (MPa)] whose value is not less than a value calculated from the expression defined by "31.19×[Melting point (° C.)]−3500", a good in-mold expanded molded product can be obtained by, for example, using the technique disclosed in Patent Literature 10 (i.e., the technique for causing the polypropylene resin to have an MFR of not less than 4 g/10 min and not more than 20 g/10 min, a melting point of not more than 145° C., and a flexural modulus of not less than 600 MPa).

In contrast, the technique of one or more embodiments of the present invention differs from the technique of Patent Literature 10. Specifically, the technique according to one or more embodiments of the present invention is a technique for causing the polypropylene resin to have a flexural modulus of not less than 750 MPa and not more than 1100 MPa, causing expanded polypropylene resin particles to have a specific melting point and a main endothermic peak apex temperature, and causing the melting point and the main endothermic peak apex temperature to differ in temperature by not less than 5° C. and not more than 15° C. With the technique of one or more embodiments of the present invention, which technique thus differs from the technique of Patent Literature 10, it is possible to obtain, even by use of a conventionally unusable polypropylene resin, expanded polypropylene resin particles that make it possible to (i) keep a molding temperature during in-mold foaming molding low, (ii) maintain, at a level not inferior to those of conventional molded products, a compressive strength of a polypropylene resin in-mold expanded molded product to be obtained by in-mold foaming molding, and (iii) produce therefrom a polypropylene resin in-mold expanded molded product excellent in surface property (beautiful in surface appearance).

Patent Literature 10 seem to show results of measurement of (i) a melting point of a polypropylene resin and (ii) a DSC low temperature peak temperature corresponding to the main endothermic peak apex temperature of the present application. Note, however, that Patent Literature 10 neither describes nor suggests a relationship between (a) a temperature difference between the melting point and the DSC low temperature peak temperature and (b) a compressive strength and a surface property of an in-mold expanded molded product, and an in-mold foaming molding pressure.

In one or more embodiments of the present invention, the polypropylene resins described earlier can be used alone or in combination of two or more kinds as the base material resin by being blended (mixed).

According to one or more embodiments of the present invention, as described later, expanded polypropylene resin particles have a melting point that is higher than a main endothermic peak apex temperature, and the melting point in a DSC curve of a second temperature increase of the expanded polypropylene resin particles and the main endothermic peak apex temperature in a DSC curve of a first temperature increase of the expanded polypropylene resin particles differ in temperature by not less than 5.0° C. and not more than 15.0° C. In order to obtain such expanded polypropylene resin particles, a base material resin containing a polypropylene resin A and a polypropylene resin B may be used.

The polypropylene resin A used in one or more embodiments of the present invention may have a melting point of not less than 130.0° C. and not more than 140.0° C., and a 1-butene-containing structural unit may be present in an amount of not less than 3 weight % and not more than 15 weight % with respect to 100 weight % entire structural units.

The polypropylene resin A may have a melting point of not less than 132.0° C. and not more than 138.0° C., or not less than 134.0° C. and not more than 138.0° C.

The polypropylene resin A which has a melting point falling within the above range and contains 1-butene in an amount falling within the above range tends to easily (i) make a molding temperature during in-mold foaming molding low and (ii) maintain, at a high level, a compressive strength of an in-mold expanded molded product to be obtained. In particular, the polypropylene resin A which contains 1-butene makes it easy to obtain expanded polypropylene resin particles whose melting point and main endothermic peak apex temperature differ in temperature by not less than 5.0° C. and not more than 15.0° C.

Further, the polypropylene resin A may be arranged to contain not only the 1-butene but also an ethylene-containing structural unit that is present in amount of not less than 2 weight % and not more than 10 weight % with respect to 100 weight % entire structural units. The polypropylene resin A which is thus arranged more easily (i) makes a molding temperature during in-mold foaming molding low and (ii) maintains, at a high level, a compressive strength of an in-mold expanded molded product to be obtained.

Under the circumstances, the polypropylene resin A may contain (i) the 1-butene-containing structural unit in an amount of not less than 4 weight % and not more than 9 weight % and (ii) the ethylene-containing structural unit in an amount of not less than 2.5 weight % and not more than 6 weight %.

Note that "100 weight % entire structural units" means that a total amount of (i) a structural unit obtained from propylene, (ii) a structural unit obtained from 1-butene, and (iii) structural unit(s) obtained from other comonomer(s) such as ethylene is 100 weight %.

In view of the above, the polypropylene resin A may be at least one kind selected from the group consisting of a propylene-1-butene random copolymer and a propylene-ethylene-1-butene random copolymer.

The polypropylene resin A of one or more embodiments of the present invention can be polymerized using a catalyst that is exemplified by, but not particularly limited to a Ziegler catalyst, a metallocene catalyst, and the like.

Note, however, that a polypropylene resin polymerized using a Ziegler catalyst generally has lower rigidity commensurate with a melting point than a polypropylene resin polymerized by use of a metallocene catalyst, and is therefore disadvantageous to be used. However, according to the technique of one or more embodiments of the present invention, a polypropylene resin polymerized using a Ziegler catalyst allows the effects of one or more embodiments of the present invention to be remarkably exhibited. Thus, a polypropylene resin polymerized using a Ziegler catalyst may be used. Further, a polypropylene resin polymerized by use of a Ziegler catalyst may be used because such a polypropylene resin is industrially easily available and widely usable.

The polypropylene resin B used in one or more embodiments of the present invention may be (i) a propylene homopolymer having a melting point of not less than 145.0° C. and not more than 165.0° C. or (ii) a copolymer containing: propylene; and a comonomer copolymerizable with propylene, and having a melting point of not less than 145.0° C. and not more than 165.0° C.

The polypropylene resin B of one or more embodiments of the present invention has a melting point of not less than 147.0° C. and not more than 160.0° C., or not less than 148.0° C. and not more than 153.0° C.

The polypropylene resin B may be a copolymer containing: propylene; and a comonomer copolymerizable with propylene. This is because such a polypropylene resin B easily makes a molding temperature during in-mold foaming molding low.

Examples of such a comonomer copolymerizable with propylene encompass C2 or C4-C12 α-olefins such as ethylene, 1-butene, 1-pentene, 1-hexene, and 4-methyl-1-butene. Of these comonomers, ethylene may be used. These comonomers can be used alone to be copolymerized with propylene, or two or more of these comonomers can be used in combination to be copolymerized with propylene.

The polypropylene resin B may be a propylene-ethylene random copolymer or a propylene-ethylene-1-butene random copolymer. This is because such a polypropylene resin B easily makes a molding temperature during in-mold foaming molding low and allows an in-mold expanded molded product to be obtained to have a compressive strength that is maintained at a high level without being reduced.

The polypropylene resin B can be polymerized by use of a catalyst that is exemplified by but not particularly limited to a Ziegler catalyst, a metallocene catalyst, and the like.

Note, however, that a polypropylene resin polymerized by use of a Ziegler catalyst generally has lower rigidity commensurate with a melting point than a polypropylene resin polymerized by use of a metallocene catalyst, and is therefore disadvantageous to be used. However, according to the technique of one or more embodiments of the present invention, a polypropylene resin polymerized using a Ziegler catalyst allows the effects of one or more embodiments of the present invention to be remarkably exhibited.

Thus, a polypropylene resin polymerized using a Ziegler catalyst may be used in one or more embodiments of the present invention. Further, a polypropylene resin polymerized by use of a Ziegler catalyst may be used because such a polypropylene resin is industrially easily available and widely usable.

The polypropylene resin A and the polypropylene resin B, which are used in one or more embodiments of the present invention, each have an MFR that is not particularly limited but may be more than 3 g/10 min and less than 15 g/10 min, or not less than 5 g/10 min and not more than 10 g/10 min.

According to one or more embodiments of the present invention, the polypropylene resin A and the polypropylene resin B are mixed at a ratio that is not particularly limited.

Note, however, that from the viewpoint of easily making a molding temperature during in-mold foaming molding low and allowing an in-mold expanded molded product to be obtained to have a compressive strength that is maintained at a high level without being reduced, the polypropylene resin A and the polypropylene resin B may be mixed so that of a total amount of the polypropylene resin A and the polypropylene resin B, which total amount is 100 weight %, the polypropylene resin A accounts for not less than 50 weight % and not more than 70 weight %, and the polypropylene resin B accounts for not less than 30 weight % and not more than 50 weight %.

As described earlier, use of the base material resin which contains the polypropylene resin A and the polypropylene resin B easily (i) causes a melting point in a DSC curve of a second temperature increase of expanded polypropylene resin particles to be higher than a main endothermic peak apex temperature in a DSC curve of a first temperature increase of the expanded polypropylene resin particles and (ii) causes the melting point and the main endothermic peak apex temperature to differ in temperature by not less than 5.0° C. and not more than 15.0° C. Thus, in one or more embodiments of the present invention, a base material resin which contains the polypropylene resin A and the polypropylene resin B may be used.

According to one or more embodiments of the present invention, examples of a method by which to mix the polypropylene resin A and the polypropylene resin B encompass (i) a method in which the polypropylene resin A and the polypropylene resin B are mixed by use of a blender, an extruder, or the like and (ii) a method in which the polypropylene resin A and the polypropylene resin B are blended by multi-stage polymerization during polymerization.

According to one or more embodiments of the present invention, it is possible to use an additive as necessary in addition to the polypropylene resin. Examples of the additive encompass a resin described later and different from the polypropylene resin, an expansion nucleating agent, a hydrophilic compound, a colorant, an antistatic agent, a flame retarder, an antioxidant, an electrically conductive agent, and the like. In a case where such an additive is used, a mixture of the polypropylene resin and the additive constitute the base material resin.

Examples of the resin which is different from the polypropylene resin and can be mixed in one or more embodiments of the present invention encompass polyethylene resins such as a high-density polyethylene resin, a medium-density polyethylene resin, a low-density polyethylene resin, and a linear low-density polyethylene resin.

In a case where a polyethylene resin is to be mixed, mixing of not less than 1 part by weight and not more than 20 parts by weight of the polyethylene resin with 100 parts by weight of the polypropylene resin makes it easier to obtain an in-mold expanded molded product excellent in surface property even by making a molding temperature during in-mold foaming molding low.

Such a polyethylene resin that contributes to an improvement in surface property may be a high-density polyethylene resin having a viscosity average molecular weight of not less than 1000 and not more than 20000, or not less than 1000 and not more than 6000.

According to one or more embodiments of the present invention, an expansion nucleating agent that can serve as an expansion nucleus during expansion may be added.

Specific examples of the expansion nucleating agent used in one or more embodiments of the present invention encompass silica (silicon dioxide), silicate, alumina, diatomaceous earth, calcium carbonate, magnesium carbonate, calcium phosphate, feldspar apatite, barium sulfate, zinc borate, polytetrafluoroethylene resin powder, and the like. Examples of silicate encompass talc, magnesium silicate, kaolin, halloysite, dickite, aluminum silicate, zeolite, and the like. These expansion nucleating agents can be used alone or in combination two or more kinds.

From the viewpoint of uniformity of cell diameters, in one or more embodiments of the present invention, the expansion nucleating agent is contained in an amount of not less than 0.005 parts by weight and not more than 2 parts by weight, or not less than 0.01 parts by weight and not more than 1 part by weight, or not less than 0.03 parts by weight and not more than 0.5 parts by weight, with respect to 100 parts by weight of the polypropylene resin.

In one or more embodiments of the present invention, addition of a hydrophilic compound yields an effect of promoting an increase in expansion ratio of expanded polypropylene resin particles.

Specific examples of a hydrophilic compound used in one or more embodiments of the present invention encompass water-absorbing organic matters such as glycerin, polyethylene glycol, glycerin fatty acid ester, melamine, isocyanuric acid, and a melamine-isocyanuric acid condensate.

In one ore more embodiments of the present invention, the hydrophilic compound is contained in an amount not less than 0.01 parts by weight and not more than 5 parts by weight, or not less than 0.1 parts by weight and not more than 2 parts by weight, with respect to 100 parts by weight of the polypropylene resin.

The hydrophilic compound which is contained in an amount of less than 0.01 parts by weight tends to make it difficult for an effect of increasing an expansion ratio and an effect of enlarging a cell diameter to be exhibited. Meanwhile, the hydrophilic compound which is contained in an amount of more than 5 parts by weight tends to make it difficult for the hydrophilic compound to be uniformly dispersed in the polypropylene resin.

Examples of the colorant used in one or more embodiments of the present invention encompass carbon black, ultramarine blue, cyanine pigment, azo pigment, quinacridone pigment cadmium yellow, chrome oxide, iron oxide, perylene pigment, Anthraquinone pigment, and the like. These colorants can be used alone or in combination of two or more kinds.

In one or more embodiments of the present invention, the colorant is contained in an amount not less than 0.001 parts by weight and not more than 10 parts by weight, or not less than 0.01 parts by weight and not more than 8 parts by weight, with respect to 100 parts by weight of the polypropylene resin.

In particular, in a case where blackening is intended by use of carbon black, the carbon black may be contained in an amount of not less than 1 part by weight and not more than 10 parts by weight with respect to 100 parts by weight of the polypropylene resin.

According to one or more embodiments of the present invention, an additive such as a resin different from the polypropylene resin, an expansion nucleating agent, a hydrophilic compound, a colorant, an antistatic agent, a flame retarder, an antioxidant, and/or an electrically conductive agent can be blended with the polypropylene resin by a method that is exemplified by but not particularly limited to a conventionally known blending method by use of a blender, an extruder, or the like.

Note, however, that the additive mentioned above can be directly added to the polypropylene resin. Alternatively, it is possible to (i) prepare a masterbatch by causing a resin different from the polypropylene resin to contain the additive at a high concentration and then (ii) add the masterbatch, in a form of a masterbatch resin, to the polypropylene resin.

A resin to be used to prepare a masterbatch resin may be a polyolefin resin, or a polypropylene resin, or a polypropylene resin identical to the base material resin.

In a case where the polypropylene resin A and the polypropylene resin B are used, a masterbatch may be prepared using a mixture of the polypropylene resin A and the polypropylene resin B.

The following description discusses the expanded polypropylene resin particles of one or more embodiments of the present invention.

The expanded polypropylene resin particles of one or more embodiments of the present invention have a melting point, obtained by differential scanning calorimetry (DSC), not less than 141.5° C. and not more than 150.0° C., or not less than 143.0° C. and not more than 148.0° C., or more than 145.0° C. and not more than 148.0° C.

The expanded polypropylene resin particles which have a melting point of less than 141.5° C. tend to cause a decrease in compressive strength of an in-mold expanded molded product to be obtained. Meanwhile, the expanded polypropylene resin particles which have a melting point of more than 150.0° C. tend to cause an increase in in-mold foaming molding pressure (and molding temperature) during in-mold foaming molding. Further, neither the expanded polypropylene resin particles which have a melting point of less than 141.5° C. nor the expanded polypropylene resin particles which have a melting point of more than 150.0° C. tend to satisfy Expression (1).

Note here that as shown in FIG. 1, a melting point tm of expanded polypropylene resin particles refers to a melting peak temperature (tm of FIG. 1) in a second temperature increase in a DSC curve obtained by differential scanning calorimetry (DSC) in which not less than 1 mg and not more than 10 mg of the expanded polypropylene resin particles are heated in a first temperature increase from 40° C. to 220° C. at a temperature increase rate of 10° C./min, then cooled from 220° C. to 40° C. at a temperature decrease rate of 10° C./min, and heated again in a second temperature increase from 40° C. to 220° C. at a temperature increase rate of 10° C./min.

Note that a plurality of melting peaks may appear in a case where a plurality of resins is mixed. Note, however, that mixing of a plurality of resins does not necessarily cause a plurality of melting peaks to appear.

For example, in a case where a polypropylene resin and a polyethylene resin are blended and greatly differ in melting point, two melting peaks in total, i.e., (i) a melting peak derived from the polypropylene resin and (ii) a melting peak (or shoulder) derived from the polyethylene resin may appear in the DSC curve of the second temperature increase. Note, however, that the melting point of the polypropylene resin of one or more embodiments of the present invention is absolutely a temperature of the melting peak derived from the polypropylene resin.

Note that the melting peak derived from the polypropylene resin and the melting peak derived from the polyethylene resin can be easily discriminated from each other in a case where respective melting points of single resins, i.e., the polypropylene resin and the polyethylene resin, which have not been blended are measured.

In contrast, in a case where the polyethylene resin and the polypropylene resin less differ in melting point, a single melting peak may appear. In this case, a temperature of the single melting peak is regarded as the melting point of the polypropylene resin of one or more embodiments of the present invention.

Meanwhile, in a case where a plurality of polypropylene resins is mixed, in the DSC curve of the second temperature increase, a single melting peak may appear, or a plurality of melting peaks may appear. In a case where a plurality of polypropylene resins is mixed and a plurality of melting peaks appears, a temperature of a melting peak having the greatest heat absorption quantity is employed as the melting point of the polypropylene resin of one or more embodiments of the present invention.

FIG. 1 shows a DSC curve of a second temperature increase of expanded polypropylene resin particles containing a base material resin in which a polypropylene resin and a polyethylene resin are blended. In the DSC curve, it is assumed that a high temperature side melting peak is derived from the polypropylene resin and a temperature tm of the high temperature side melting peak is a melting point.

Note that in one or more embodiments of the present invention, the expanded polypropylene resin particles and the polypropylene resin in-mold expanded molded product can be returned to a state of an unexpanded resin by, for example, being heated at 180° C. to 220° C. for 5 minutes to 30 minutes (as necessary, being subjected to a degassing operation (e.g., vacuuming) while being heated). It is also possible to measure a melting point of such an unexpanded resin as in the case of the measurement of the melting point of the expanded polypropylene resin particles, and the melting point of the unexpanded resin is substantially equal to the melting point of the expanded polypropylene resin particles.

In the DSC curve of the second temperature increase, the expanded polypropylene resin particles of one or more embodiments of the present invention has a high temperature melting heat quantity ratio (hereinafter may be referred to as a "second high temperature heat quantity ratio") [(j/J)×100(%)], which is a ratio of (A) a melting heat quantity (j) from the melting point to a melting end temperature to (B) an entire resin melting heat quantity (J), of not less than 15% and less than 20%, or not less than 16% and less than 20%, or not less than 17% and less than 20%.

Either the expanded polypropylene resin particles which have a second high temperature heat quantity ratio of less than 15% or the expanded polypropylene resin particles which have a second high temperature heat quantity ratio of not less than 20% tend to make it difficult to achieve both (a) a reduction in molding temperature during in-mold foaming molding and (b) maintenance of a compressive strength of a polypropylene resin in-mold expanded molded product.

Note here that the second high temperature heat quantity ratio of the expanded polypropylene resin particles is defined as below by use of FIG. 1.

In the obtained DSC curve of the second temperature increase (FIG. 1), the entire resin melting heat quantity (J) is indicated by a part surrounded by (i) a line segment a-b that is drawn so as to connect (a) a heat absorption quantity (point a) at a temperature of 80° C. and (b) a heat absorption quantity (point b) at a temperature at which melting on a high temperature side ends and (ii) the DSC curve.

Next, assuming that a point at which the line segment a-b intersects a line that is drawn so as to extend, in parallel with a Y-axis, from a peak top (point c) of the melting point tm in the DSC is a point d, the melting heat quantity (j) from the melting point to the melting end temperature is indicated by a part surrounded by a line segment b-d, a line segment c-d, and the DSC curve.

Then, the second high temperature heat quantity ratio is calculated from [(j/J)×100(%)].

The expanded polypropylene resin particles of one or more embodiments of the present invention have, in a DSC curve of a first temperature increase, where the DSC curve is obtained by differential scanning calorimetry (DSC) in which the expanded polypropylene resin particles of one or more embodiments of the present invention are heated from 40° C. to 220° C. at a temperature increase rate of 10° C./min, (i) a main endothermic peak having an apex temperature not less than 130.0° C. and not more than 145.0° C. and (ii) at least one endothermic peak on a high temperature side of the main endothermic peak.

Note that the main endothermic peak of the expanded polypropylene resin particles of the present application refers to a peak having an apex in a temperature region lower than the melting point tm (described earlier) of the expanded polypropylene resin particles. Meanwhile, the endothermic peak on the high temperature side of the main endothermic peak refers to a peak having an apex in a temperature region higher than the melting point tm (described earlier) of the expanded polypropylene resin particles.

The expanded polypropylene resin particles of one or more embodiments of the present invention, which expanded polypropylene resin particles have (i) a main endothermic peak and (ii) at least one endothermic peak on a high temperature side of the main endothermic peak, make it possible to obtain a good in-mold expanded molded product at an in-mold foaming molding pressure in a wide range during in-mold foaming molding. That is, such expanded polypropylene resin particles enable stable in-mold foaming molding due to a great molding temperature width, so that fewer defective products are produced. Further, such expanded polypropylene resin particles allow even a complex shaped molded product to be easily subjected to in-mold foaming molding.

Note that the at least one endothermic peak on the high temperature side of the main endothermic peak may be one endothermic peak. In a case where the at least one endothermic peak on the high temperature side of the main endothermic peak is one endothermic peak, the expanded polypropylene resin particles easily have uniform cell diameters, and a good surface property is easily achieved during in-mold foaming molding.

Note that expanded polypropylene resin particles having (i) a main endothermic peak and (ii) at least one endothermic peak on a high temperature side of the main endothermic peak can be easily obtained by, in a method (described later) for producing expanded polypropylene resin particles in an aqueous dispersion system, (i) appropriately regulating, to a proper value, a temperature in a pressure-resistant vessel during foaming (hereinafter may be referred to as a "foaming temperature"), and (ii) retaining the temperature for a certain period of time.

That is, in a case where a melting point of a polypropylene resin (base material resin) is Tm (° C.), the foaming temperature may be not less than Tm-8 (° C.), or not less than Tm-5 (° C.) and not more than Tm+4 (° C.), or not less than Tm-5 (° C.) and not more than Tm+3 (° C.).

Note that a time during which the polypropylene resin particles are retained at the temperature in the pressure-resistant vessel during foaming may be not less than 1 minute and not more than 120 minutes, or not less than 5 minutes and not more than 60 minutes.

The expanded polypropylene resin particles of one or more embodiments of the present invention have a main endothermic peak which have an apex temperature of not less than 130.0° C. and not more than 145.0° C., or not less than 133.0° C. and not more than 142.0° C., or not less than 135.0° C. and not more than 138.0° C.

The apex temperature of less than 130.0° C. tends to cause a decrease in compressive strength of an in-mold expanded molded product to be obtained. Meanwhile, the apex temperature of more than 145.0° C. does not tend to cause a decrease in a molding temperature during in-mold foaming molding.

The expanded polypropylene resin particles of one or more embodiments of the present invention have, in a DSC curve of a second temperature increase of the expanded polypropylene resin particles, a melting point which is higher than a main endothermic peak apex temperature in a DSC curve of a first temperature increase of the expanded polypropylene resin particles, and the melting point and the main endothermic peak apex temperature differ in temperature by not less than 5.0° C. and not more than 15.0° C.

The melting point and the main endothermic peak apex temperature which differ in temperature by less than 5.0° C. tend to make it difficult to achieve a balance among a low in-mold foaming molding pressure, a high compressive strength, and a good surface property, any of which easily tends to deteriorate. Meanwhile, even in a case where (i) an attempt to regulate a kind and a contained amount of a comonomer of a polypropylene resin, or kinds of polypropylene resins mixed and a mixing ratio thereof and (ii) an attempt to regulate a foaming condition (described later) are to be carried out so that the melting point and the main endothermic peak apex temperature differ in temperature by more than 15.0° C., these attempts require excessive trial and error and thus are substantially difficult to carry out. Under the circumstances, the melting point and the main endothermic peak apex temperature differ in temperature by not less than 5.5° C. and not more than 10.0° C., or by not less than 5.5° C. and not more than 9.0° C., or by not less than 5.5° C. and not more than 8.0° C. In particular, in a case where the melting point and the main endothermic peak apex temperature differ in temperature by not less than 5.5° C. and not more than 8.0° C., the expanded polypropylene resin particles easily have more uniform cell diameters. Given this, a polypropylene resin in-mold expanded molded product that has a high compressive strength and a beautiful surface appearance can be easily obtained even at a low in-mold foaming molding pressure.

According to one or more embodiments of the present invention, a resin different from a polypropylene resin can be mixed provided that the resin does not impair the effects of one or more embodiments of the present invention. Note, however, that should a polyethylene resin be mixed, three melting peaks in total, i.e., (i) a main endothermic peak, (ii) at least one endothermic peak on a high temperature side of the main endothermic peak, and (iii) a melting peak (or shoulder), derived from the polyethylene resin, on a low temperature side of the main endothermic peak may appear in the DSC curve of the first temperature increase of the expanded polypropylene resin particles.

The expanded polypropylene resin particles of one or more embodiments of the present invention have, in the DSC curve of the first temperature increase of the expanded polypropylene resin particles, a ratio of (A) a melting heat quantity of a high temperature side of a main endothermic peak (Qh) to (B) an entire melting heat quantity [={Qh/(Ql+Qh)}×100(%)] (hereinafter may be referred to as a "first high temperature heat quantity ratio"), the ratio being not less than 15% and not more than 50%, or not less than 15% and not more than 40%, or not less than 20% and not more than 30%.

In a case where the first high temperature heat quantity ratio falls within the above range, a polypropylene resin in-mold expanded molded product which has (i) a beautiful surface appearance, (ii) a high compressive strength, and (iii) good fusibility is made more easily obtainable even in a case where the polypropylene resin in-mold expanded molded product is produced at a low molding temperature (steam pressure).

Note here that in one or more embodiments of the present invention, an entire melting heat quantity of expanded polypropylene resin particles (hereinafter, this heat quantity is also referred to as "Q"), a main endothermic peak melting heat quantity (hereinafter, this heat quantity is also referred to as "Ql"), and a melting heat quantity of an endothermic peak on a high temperature side of a main endothermic peak (hereinafter, this heat quantity is also referred to as "Qh") are defined as below by use of FIG. 2.

In the obtained DSC curve (FIG. 2), the entire melting heat quantity (Q=Ql+Qh), which is a sum of (i) the main endothermic peak melting heat quantity (Ql) and (ii) the melting heat quantity of the endothermic peak on the high temperature side of the main endothermic peak (Qh), is indicated by a part surrounded by (i) a line segment A-B that is drawn so as to connect (a) a heat absorption quantity (point A) at a temperature of 80° C. and (b) a heat absorption quantity (point B) at a temperature at which melting on a high temperature side ends and (ii) the DSC curve.

Assuming that (i) a point C is a point at which a heat absorption quantity between (a) the main endothermic peak in the DSC curve and (b) a high temperature side endothermic peak closest to the main endothermic peak is the smallest and (ii) a point D is a point at which the line segment A-B intersects a line that is drawn so as to extend, in parallel with a Y-axis, from the point C to the line segment A-B, Ql is indicated by a part surrounded by a line segment A-D, a line segment C-D, and the DSC curve, and Qh is indicated by a part surrounded by a line segment B-D, the line segment C-D, and the DSC curve.

Note that the first high temperature heat quantity ratio of the expanded polypropylene resin particles can be appropriately regulated by, for example, a retention time, a foaming temperature, or a foaming pressure (pressure during foaming).

In general, a first high temperature heat quantity ratio or a high temperature side melting peak heat quantity tends to be made larger by extending a retention time, decreasing a foaming temperature, or decreasing a foaming pressure.

In view of the above, a condition under which to obtain a desired first high temperature heat quantity ratio can be easily found by carrying out several experiments in which a retention time, a foaming temperature, or a foaming pressure is systematically changed. Note that the foaming pressure can be adjusted by an amount of a foaming agent.

Note that PCT International Publication No. WO2009/001626 discloses expanded polypropylene resin particles having a crystal structure in which a DSC curve of a first temperature increase, which DSC curve is obtained by heat flux differential scanning calorimetry in which the expanded polypropylene resin particles are heated from a normal temperature to 200° C. at a temperature increase rate of 2° C./min, show (i) a main endothermic peak having an endothermic peak heat quantity of 70% to 95% with respect to an entire endothermic peak heat quantity and having an endothermic peak apex temperature of 100° C. to 140° C. and (ii) two or more endothermic peaks on a high temperature side of the main endothermic peak.

The expanded polypropylene resin particles of one or more embodiments of the present invention are not limited in number of endothermic peaks on a high temperature side of a main endothermic peak, which number is mentioned in PCT International Publication No. WO2009/001626 and obtained in a case where heat flux differential scanning calorimetry is carried out at a temperature increase rate of 2° C./min. Note, however, that the expanded polypropylene resin particles of one or more embodiments of the present invention may have a crystal structure in which a single endothermic peak on a high temperature side of a main endothermic peak appears.

In a case where a plurality of polypropylene resins is used by being blended, two or more endothermic peaks easily appear on a high temperature side of a main endothermic peak in a case where heat flux differential scanning calorimetry is carried out at a temperature increase rate of 2° C./min. Note, however, that by causing the plurality of polypropylene resins to differ in melting point by less than 25° C., the expanded polypropylene resin particles of one or more embodiments of the present invention can easily have a crystal structure in which a single endothermic peak on a high temperature side of a main endothermic peak appears. Specifically, for example, use of a base material resin containing (i) a polypropylene resin A having a melting point of not less than 130° C. and not more than 140° C. and (ii) a polypropylene resin B having a melting point being higher than that of the polypropylene resin A by less than 25° C. easily causes appearance of a single endothermic peak on the high temperature side of the main endothermic peak in a case where heat flux differential scanning calorimetry is carried out at a temperature increase rate of 2° C./min.

In one or more embodiments of the present invention, the expanded polypropylene resin particles which have a crystal structure in which a single endothermic peak appears on the high temperature side of the main endothermic peak may be used. This is because such expanded polypropylene resin particles (i) make it possible to achieve good compatibility between both resins (the polypropylene resin A and the polypropylene resin B) which are being melted and kneaded, (ii) easily have uniform cell diameters, and (iii) allow an in-mold expanded molded product to have a beautiful surface appearance.

The expanded polypropylene resin particles of one or more embodiments of the present invention have an expansion ratio that is not particularly limited but may be not less than 5 times and not more than 60 times.

The expanded polypropylene resin particles which have an expansion ratio of less than 5 times tend to insufficiently make the expanded polypropylene resin particles and a polypropylene resin in-mold expanded molded product lighter. Meanwhile, the expanded polypropylene resin particles which have an expansion ratio of more than 60 times tend to prevent the expanded polypropylene resin particles and a polypropylene resin in-mold expanded molded product from having practical mechanical strengths.

The expanded polypropylene resin particles of one or more embodiments of the present invention have an average cell diameter of not less than 100 μm and not more than 400 μm, or not less than 105 μm and not more than 360 μm, or not less than 110 μm and not more than 330 μm.

The expanded polypropylene resin particles which have an average cell diameter falling within the above range tend to allow a polypropylene resin in-mold expanded molded product to have a beautiful surface appearance and a high compressive strength.

Note that the average cell diameter of the expanded polypropylene resin particles can be regulated by an added amount of an expansion nucleating agent (described earlier). Alternatively, the average cell diameter can be controlled by, for example, a first high temperature heat quantity ratio (described later). The first high temperature heat quantity ratio which is less than 15% tends to make the average cell diameter great. Meanwhile, the first high temperature heat quantity ratio which is more than 50% tends to make the average cell diameter small.

Next, the expanded polypropylene resin particles of one or more embodiments of the present invention can be produced by the following method.

In production of the expanded polypropylene resin particles of one or more embodiments of the present invention, a method (granulation step) of producing polypropylene resin particles containing a base material resin can be carried out first.

Examples of the method of producing polypropylene resin particles encompass a method in which an extruder is used.

Specifically, polypropylene resin particles each having a desired shape, such as a columnar shape, an elliptical shape, a spherical shape, a cubic shape, or a rectangular parallelepiped shape can be obtained by (i) blending a polypropylene resin, and, as necessary, an additive such as a resin different from the polypropylene resin, an expansion nucleating agent, a hydrophilic compound, and/or a colorant so as to obtain a blended product, (ii) introducing the blended product into an extruder so as to melt and knead the blended product, (iii) extruding a resultant product via a die provided at a tip of the extruder, (iv) cooling the resultant product by, for example, allowing the resultant product to pass through water, and (iv) chopping the resultant product with a cutter. Alternatively, it is possible to (i) directly extrude the resultant product into water via the die, (ii) immediately cut the resultant product into particles, and (iii) cool the particles. The blended product which is thus melted and kneaded is made into a more uniform base material resin.

Alternatively, it is possible to (i) introduce a polypropylene resin and, as necessary, a resin different from the polypropylene resin into an extruder, and (ii) as necessary, feed an additive such as an expansion nucleating agent, a hydrophilic compound, and/or a colorant from a middle part of the extruder so that a resultant mixture is mixed in the extruder so as to be melted and kneaded.

The polypropylene resin particles thus obtained have a weight not less than 0.2 mg per particle and not more than 10 mg per particle, or not less than 0.5 mg per particle and not more than 5 mg per particle.

The polypropylene resin particles which have a weight of less than 0.2 mg per particle tend to cause a deterioration in handleability. Meanwhile, the polypropylene resin particles which have a weight of more than 10 mg per particle tend to cause a deterioration in mold-filling property during an in-mold foaming molding step.

The expanded polypropylene resin particles of one or more embodiments of the present invention can be produced by the polypropylene resin particles obtained as described earlier.

Examples of the method for producing the expanded polypropylene resin particles of one or more embodiments of the present invention encompass a method for producing expanded polypropylene resin particles in an aqueous dispersion system by carrying out a foaming step of (i) dispersing polypropylene resin particles together with a foaming agent such as carbon dioxide into an aqueous dispersion medium in a pressure-resistant vessel, (ii) heating a resultant dispersion liquid to a temperature being not less than a softening temperature of the polypropylene resin particles, and applying pressure to the resultant dispersion liquid, (iii) retaining the temperature and the pressure for a certain period of time, and (iv) releasing the dispersion liquid in the pressure-resistant vessel into a pressure region having a pressure lower than an internal pressure of the pressure-resistant vessel (hereinafter, this pressure region is also referred to as a "low pressure region").

A method for producing the expanded polypropylene resin particles according to one or more embodiments of the present invention is specifically exemplified by the following method.

(1) Polypropylene resin particles, an aqueous dispersion medium, and, as necessary, a dispersing agent, for example are placed in a pressure-resistant vessel. Thereafter, while a resultant mixture is being stirred, an inside of the pressure-resistant vessel is made vacuous as necessary. Then, a foaming agent having a pressure of not less than 1 MPa (gauge pressure) and not more than 2 MPa (gauge pressure) is introduced, and a resultant mixture is heated to a temperature being not less than a softening temperature of a polypropylene resin. By the heating, an internal pressure of the pressure-resistant vessel rises to approximately not less than 2 MPa (gauge pressure) and not more than 5 MPa (gauge pressure). As necessary, a foaming agent is further added at a temperature around a foaming temperature so that a foaming pressure is regulated as desired, and the temperature is further regulated. Thereafter, the temperature and the foaming pressure are retained for a certain period of time. Subsequently, a dispersion liquid in the pressure-resistant vessel is released into a pressure region having a pressure lower than the internal pressure of the pressure-resistant vessel, so that expanded polypropylene resin particles can be obtained.

Another aspect of the method for producing the expanded polypropylene resin particles according to one or more embodiments of the present invention is exemplified by the following method.

(2) Polypropylene resin particles, an aqueous dispersion medium, and, as necessary, a dispersing agent, for example are placed in a pressure-resistant vessel. Thereafter, while a resultant mixture is being stirred, an inside of the pressure-resistant vessel is made vacuous as necessary. Then, while the resultant mixture in the pressure-resistant vessel is heated to a temperature being not less than a softening temperature of a polypropylene resin, a foaming agent can be introduced into the resultant mixture in the pressure-resistant vessel.

Still another aspect of the method for producing the expanded polypropylene resin particles according to one or more embodiments of the present invention is exemplified by the following method.

(3) Polypropylene resin particles, an aqueous dispersion medium, and, as necessary, a dispersing agent, for example are placed in a pressure-resistant vessel. Thereafter, a resultant dispersion liquid is heated to a temperature around a foaming temperature. Then, a foaming agent is further introduced into the dispersion liquid in the pressure-resistant vessel, and a resultant mixture has a foaming temperature. Thereafter, the foaming temperature is retained for a certain period of time. Then, the dispersion liquid in the pressure-resistant vessel is released into a pressure region having a pressure lower than an internal pressure of the pressure-resistant vessel, so that expanded polyolefin resin particles can be obtained.

Note that an expansion ratio can be regulated by (i) adjusting, before releasing the dispersion liquid in the pressure-resistant vessel into the low pressure region, a pressure-releasing speed during foaming by increasing the internal pressure of the pressure-resistant vessel by injecting, into the pressure-resistant vessel, carbon dioxide, nitrogen, air, or a substance used as a foaming agent, and (ii) controlling, also while releasing the dispersion liquid in the pressure-resistant vessel into the low pressure region, the pressure in the pressure-resistant vessel by introducing, into the pressure-resistant vessel, carbon dioxide, nitrogen, air, or a substance used as a foaming agent.

The expanded polypropylene resin particles of one or more embodiments of the present invention have, in a DSC curve of a second temperature increase of the expanded polypropylene resin particles, a melting point which is higher than a main endothermic peak apex temperature in a DSC curve of a first temperature increase of the expanded polypropylene resin particles, and the melting point and the main endothermic peak apex temperature differ in temperature by not less than 5.0° C. and not more than 15.0° C. The melting point and the main endothermic peak apex temperature easily differ in temperature by not less than 5.0° C. and not more than 15.0° C. by a method of setting, at not more than 40° C., a temperature of a low pressure region to which a dispersion liquid in a pressure-resistant vessel is to be released. In one or more embodiments of the present invention, this method may be used for producing expanded polypropylene resin particles.

In particular, in a case where the expanded polypropylene resin particles in which one kind of polypropylene resin instead of a plurality of polypropylene resins is used are arranged such that the melting point and the main endothermic peak apex temperature differ in temperature by not less than 5.0° C. and not more than 15.0° C., the above method serves as effective means for producing the expanded polypropylene resin particles of one or more embodiments of the present invention.

Also in the case of the expanded polypropylene resin particles in which a plurality of polypropylene resins is used, e.g., in the case of the expanded polypropylene resin particles in which the base material resin containing the polypropylene resin A and the polypropylene resin B as described earlier is used, it is a matter of course that the above method serves as effective means for producing the expanded polypropylene resin particles of one or more embodiments of the present invention.

Note that the temperature of the low pressure region only needs to be set at not more than 40° C. before the release of the dispersion liquid and can spontaneously increase in accordance with the release of the dispersion liquid. Note, however, that the increase in temperature during the release of the dispersion liquid may be prevented by known means such as air cooling or water cooling.

According to one or more embodiments of the present invention, a pressure-resistant vessel into which to disperse polypropylene resin particles is not particularly limited provided that the pressure-resistant vessel is capable of resisting a pressure inside the vessel and a temperature inside the vessel during production of expanded particles. Examples of the pressure-resistant vessel encompass an autoclave-type pressure-resistant vessel.

In one or more embodiments of the present invention, only water may be used as an aqueous dispersion medium. As the aqueous dispersion medium, it is also possible to use a dispersion medium obtained by adding methanol, ethanol, ethylene glycol, glycerin, or the like to water. In a case where the base material resin contains a hydrophilic compound in one or more embodiments of the present invention, water in the aqueous dispersion medium also acts as a foaming agent. This contributes to an increase in expansion ratio.

Examples of a foaming agent used in one or more embodiments of the present invention encompass saturated hydrocarbons such as propane, butane, and pentane; ethers such as dimethyl ether; alcohols such as methanol and ethanol; and inorganic gases such as air, nitrogen, carbon dioxide, and water. Of these foaming agents, an inorganic gas foaming agent may be used because it has a particularly small environmental impact, as well as no risk of burning. In one or more embodiments, at least one foaming agent selected from carbon dioxide and water may be used.

According to one or more embodiments of the present invention, a dispersing agent and/or a dispersion auxiliary agent may be used so as to prevent polypropylene resin particles in the aqueous dispersion medium from agglomerating.

Examples of the dispersing agent encompass inorganic dispersion agents such as tertiary calcium phosphate, tertiary magnesium phosphate, basic magnesium carbonate, calcium carbonate, barium sulfate, kaolin, talc, and clay. These inorganic dispersion agents can be used alone or in combination of two or more kinds.

Examples of the dispersion auxiliary agent encompass (i) anionic surfactants of a carboxylate type, (ii) anionic surfactants of a sulfonate type such as alkylsulfonic acid salt, n-paraffin sulfonate, alkyl benzene sulfonate, alkyl naphthalene sulfonate, and sulfosuccinate, (iii) anionic surfactants of a sulfic ester type such as sulfonated oil, alkyl sulfate, alkyl ether sulfate, and alkyl amide sulfate, and (iv) anionic surfactants of a phosphoric ester type such as alkyl phosphate, polyoxyethylene phosphate, and alkyl allyl ether sulfate. These dispersion auxiliary agents can be used alone or in combination of two or more kinds.

Of the above dispersing agents and dispersion auxiliary agents, (i) at least one kind of dispersing agent selected from the group consisting of tertiary calcium phosphate, tertiary magnesium phosphate, barium sulfate, and kaolin; may be used in combination with (ii) a dispersion auxiliary agent which is n-paraffin sulfonic acid soda.

According to one or more embodiments of the present invention, an aqueous dispersion medium may be used in an amount of not less than 100 parts by weight and not more than 500 parts by weight with respect to 100 parts by weight of polypropylene resin particles so as to allow the polypropylene resin particles to be satisfactorily dispersed in the aqueous dispersion medium. Note that respective amounts of a dispersing agent used and a dispersion auxiliary agent used vary depending on (i) kinds of the dispersing agent and the dispersion auxiliary agent and (ii) a kind and an amount of polypropylene resin particles used. Normally, with respect to 100 parts by weight of polypropylene resin particles, the dispersing agent may be used in an amount of not less than 0.2 parts by weight and not more than 3 parts by weight, and the dispersion auxiliary agent may be used in an amount of not less than 0.001 parts by weight and not more than 0.1 parts by weight.

The step of thus obtaining expanded polypropylene resin particles from polypropylene resin particles may be referred to as a "first-stage foaming step", and the expanded polypropylene resin particles thus obtained may be referred to as "first-stage expanded particles".

First-stage expanded particles may be less likely to have a high expansion ratio, though depending on foaming conditions such as a foaming pressure during production, a foaming temperature during production, and a kind of a foaming agent used during production. In particular, as described earlier, during the first-stage foaming step, the first-stage expanded particles tend to be less likely to have a high expansion ratio in a case where the temperature of the low pressure region is set at not more than 40° C. than in a case where the temperature of the low pressure region is set at a high temperature around 100° C.

In such a case, expanded polypropylene resin particles which have a higher expansion ratio than first-stage expanded particles can be obtained by, for example, (i) applying an internal pressure to the first-stage expanded particles by impregnating the first-stage expanded particles with inorganic gas (e.g., air, nitrogen, or carbon dioxide) and then (ii) bringing the first-stage expanded particles into contact with steam having a specific pressure.

The step of thus further foaming the expanded polypropylene resin particles so as to obtain expanded polypropylene resin particles having a higher expansion ratio may be referred to as a "second-stage foaming step". Expanded polypropylene resin particles thus obtained through the second-stage foaming step may be referred to as "second-stage expanded particles".

According to one or more embodiments of the present invention, in view of an expansion ratio of second-stage expanded particles, a pressure of steam during the second-stage foaming step may be regulated so as to be not less than 0.01 MPa (gauge pressure) and not more than 0.18 MPa (gauge pressure), or not less than 0.02 MPa (gauge pressure) and not more than 0.15 MPa (gauge pressure).

In a case where the pressure of the steam during the second-stage foaming step is less than 0.01 MPa (gauge pressure), the expansion ratio tends to be less likely to increase. Meanwhile, in a case where the pressure of the steam during the second-stage foaming step is more than 0.18 MPa (gauge pressure), second-stage expanded particles to be obtained tend to agglomerate and thus be unable to be subjected to subsequent in-mold foaming molding.

An internal pressure of air with which to impregnate the first-stage expanded particles is desirably changed as appropriate in view of (a) the expansion ratio of the second-stage expanded particles and (b) a steam pressure during the second-stage foaming step. The internal pressure of the air with which to impregnate the first-stage expanded particles may be not less than 0.15 MPa (absolute pressure) and not more than 0.6 MPa (absolute pressure).

In a case where the internal pressure of the air with which to impregnate the first-stage expanded particles is less than 0.15 MPa (absolute pressure), steam having a high pressure is necessary for an increase in expansion ratio, so that the second-stage expanded particles tend to agglomerate. Meanwhile, in a case where the internal pressure of the air with which to impregnate the first-stage expanded particles is more than 0.6 MPa (absolute pressure), the second-stage expanded particles tend to become open cell foam. In such a case, rigidity (e.g., compressive strength) of an in-mold expanded molded product tends to decrease.

A DSC curve of a first temperature increase of second-stage expanded particles has a curve shape slightly different from that of a DSC curve of first-stage expanded particles due to an influence of a thermal history in the second-stage foaming step. Note, however, that a first high temperature heat quantity ratio of the second-stage expanded particles can be found by a method similar to the method described earlier. The first high temperature heat quantity ratio of the second-stage expanded particles which first high temperature heat quantity ratio is thus found is substantially equal to a first high temperature heat quantity ratio of the first-stage expanded particles, and may be not less than 15% and not more than 50%, or not less than 15% and not more than 40%, or not less than 20% and not more than 30%.

The expanded polypropylene resin particles of one or more embodiments of the present invention can be made into a polypropylene resin in-mold expanded molded product by a conventionally known in-mold foaming molding method.

A usable in-mold foaming molding method is exemplified by the following methods:

i) a method of (a) subjecting expanded polypropylene resin particles to a pressure treatment by use of inorganic gas (e.g., air, nitrogen, carbon dioxide, or the like) so that the expanded polypropylene resin particles, which are impregnated with the inorganic gas, have a given internal pressure, (b) filling a mold with the expanded polypropylene resin particles, and (c) heating the mold by steam so that the expanded polypropylene resin particles are fused to each other;

ii) a method of (a) compressing expanded polypropylene resin particles by a gas pressure, (b) filling a mold with the expanded polypropylene resin particles, and (c) heating the mold by steam, while using resilience of the expanded polypropylene resin particles, so that the expanded polypropylene resin particles are fused to each other; and iii) a method of (a) filling a mold with expanded polypropylene resin particles which are not particularly pre-treated and (b) heating the mold by steam so that the expanded polypropylene resin particles are fused to each other.

A DSC curve of a first temperature increase of a polypropylene resin in-mold expanded molded product has a curve shape slightly different from that of a DSC curve of expanded polypropylene resin particles due to an influence of a thermal history in the in-mold foaming molding step. Note, however, that a first high temperature heat quantity ratio of the polypropylene resin in-mold expanded molded product can be found by a method similar to the method described earlier. The first high temperature heat quantity ratio of the polypropylene resin in-mold expanded molded product which first high temperature heat quantity ratio is thus found is substantially equal to a high temperature heat quantity ratio of the expanded polypropylene resin particles, and may be not less than 15% and not more than 50%, or not less than 15% and not more than 40%, or not less than 20% and not more than 30%.

A polypropylene resin in-mold expanded molded product of one or more embodiments of the present invention is not particularly limited in molded product density. According to a conventional technique, a decrease in compressive strength in a case where molding can be carried out at a low molding pressure (molding temperature) tends to be significant in a case where a molded product has a molded product density of not more than 40 g/L. Meanwhile, the effects of one or more embodiments of the present invention are exhibited even in the case where a molded product has a molded product density of not more than 40 g/L. According to one or more embodiments of the present invention, the polypropylene resin in-mold expanded molded product has a molded product density of not more than 40 g/L. The polypropylene resin in-mold expanded molded product of one or more embodiments of the present invention may have a molded product density of not less than 20 g/L and not more than 35 g/L.

A polypropylene resin in-mold expanded molded product thus obtained can be variously used for, for example, not only automobile interior materials and automobile bumper core materials but also heat insulating materials, shock-absorbing packing materials, and returnable containers.

In particular, the polypropylene resin in-mold expanded molded product of one or more embodiments of the present invention may be used for automobile materials such as automobile interior materials and automobile bumper core materials. This is because such automobile materials obtained from the polypropylene resin in-mold expanded molded product, which can be molded at a lower molding temperature (steam pressure), display a compressive strength similar to that of automobile materials obtained from a conventional molded product molded at a high molding temperature (steam pressure).

EXAMPLES

One or more embodiments of the present invention are more specifically described below with reference to Examples and Comparative Examples. Note, however, that one ore more embodiments of the present invention are not limited only by such Examples.

The following are substances used in Examples and Comparative Examples.

Polypropylene Resin

Examples and Comparative Examples used polypropylene resins A-1 through A-6, polypropylene resins B-1 through B-5, a polypropylene resin C, and a polypropylene resin D, each of which is shown in Table 1. Note that the polypropylene resin B-5 is a propylene homopolymer, and the other polypropylene resins are each a random copolymer.

TABLE 1

|  | Kind of catalyst | Comonomer content (weight %) | | Melting point (° C.) | MFR (g/10 min) | Flexural modulus (MPa) |
| --- | --- | --- | --- | --- | --- | --- |
|  |  | 1-butene | Ethylene |  |  |  |
| Polypropylene resin A-1 | Ziegler | 4.3 | 2.9 | 134 | 7 | 770 |
| Polypropylene resin A-2 | Ziegler | 7.0 | 2.5 | 132 | 8 | 710 |
| Polypropylene resin A-3 | Ziegler | 8.6 | 4.3 | 134 | 8 | 750 |
| Polypropylene resin A-4 | Ziegler | 9.5 | 5.1 | 136 | 7 | 790 |
| Polypropylene resin A-5 | Ziegler | — | 3.5 | 145 | 8 | 1000 |
| Polypropylene resin A-6 | Ziegler | 1.9 | 5.1 | 132 | 8 | 660 |
| Polypropylene resin B-1 | Ziegler | — | 2.5 | 152 | 7 | 1330 |
| Polypropylene resin B-2 | Ziegler | — | 3.1 | 151 | 7 | 1300 |
| Polypropylene resin B-3 | Ziegler | — | 3.3 | 145 | 8 | 1070 |
| Polypropylene resin B-4 | Ziegler | — | 3.6 | 136 | 6 | 680 |
| Polypropylene resin B-5 | Ziegler | — | — | 164 | 5 | 1650 |
| Polypropylene resin C | Metallocene | — | 2.8 | 125 | 7 | 720 |
| Polypropylene resin D | Ziegler | — | 3.6 | 141.5 | 2.9 | 850 |

Other additives
High-density polyethylene; manufactured by Mitsui Chemicals, Inc., EXCEREX 40800 (viscosity average molecular weight: 4000)
Talc: manufactured by Hayashi-Kasei Co., Ltd., Talcan Powder PK-S
Polyethylene glycol: manufactured by Lion Corporation, PEG# 300
Carbon black: manufactured by Mitsubishi Chemical Corporation, MCF88 (average particle size: 18 nm)

Note that Examples and Comparative Examples carried out evaluations by the following method.

(Quantification of Copolymer Composition)

A polypropylene resin having a known comonomer content was hot pressed at 180° C., so that a film having a thickness of approximately 100 μm was produced. The film thus produced was subjected to IR spectrum measurement, so that a propylene-derived absorbance ($I_{810}$) at 810 cm$^{-1}$, an ethylene comonomer-derived absorbance ($I_{733}$) at 733 cm$^{-1}$, and a butene comonomer-derived absorbance ($I_{766}$) at 766 cm$^{-1}$ were read.

Then, a calibration curve indicative of an ethylene comonomer content was produced by letting an absorbance ratio ($I_{733}/I_{810}$) be a horizontal axis and letting the ethylene comonomer content be a vertical axis. As in the case of the calibration curve indicative of the ethylene comonomer content, a calibration curve indicative of a butene comonomer content was produced by letting an absorbance ratio ($I_{766}/I_{810}$) be the horizontal axis and letting the butene comonomer content be the vertical axis.

Subsequently, as in the case of production of a sample during the production of the calibration curves, (i) a polypropylene resin having an unknown comonomer content was hot pressed, so that a film having a thickness of approximately 100 μm was produced, (ii) $I_{810}$, $I_{733}$, and $I_{766}$ were read by IR spectrum measurement, and (iii) an ethylene comonomer content and a butene comonomer content were calculated in accordance with the calibration curves produced earlier.

(Measurement of Melting Point Tm of Expanded Polypropylene Resin Particles)

A melting point tm of expanded polypropylene resin particles was measured by use of a differential scanning calorimeter DSC (manufactured by Seiko Instruments Inc., model: DSC6200). Specifically, the melting point tm was found as a melting peak temperature in a second temperature increase in a DSC curve obtained by (i) heating 5 mg to 6 mg of the expanded polypropylene resin particles from 40° C. to 220° C. at a temperature increase rate of 10° C./min so as to melt a resin, (ii) cooling the expanded polypropylene resin particles from 220° C. to 40° C. at a temperature decrease rate of 10° C./min so as to crystallize the melted resin, and then (iii) heating the crystallized resin from 40° C. to 220° C. at a temperature increase rate of 10° C./min (see tm of FIG. 1).

(Expansion Ratio of Expanded Polypropylene Resin Particles)

Approximately not less than 3 g and not more than 10 g of the obtained expanded polypropylene resin particles were taken. The taken expanded polypropylene resin particles were dried at 60° C. for 6 hours and then were subjected to conditioning indoors at 23° C. and at a humidity of 50%. Subsequently, a weight w (g) of the expanded polypropylene resin particles was measured, and then a volume v (cm$^3$) of the expanded polypropylene resin particles was measured by immersing the expanded polypropylene resin particles into water, so that an absolute specific gravity ($\rho_b$=w/v) of the expanded particles was obtained. Thereafter, based on a ratio of the absolute specific gravity to a density ($\rho_r$) of the polypropylene resin particles which had not been expanded, an expansion ratio ($K=\rho_r/\rho_b$) was found.

Note that in each of Examples and Comparative Examples (described later), the density (pr) of the polypropylene resin particles which had not been expanded (polypropylene resin particles) was 0.9 g/cm$^3$.

(Average Cell Diameter of Expanded Polypropylene Resin Particles)

An obtained expanded polypropylene resin particle was cut at its substantial center while notice was taken so that a cell membrane of the expanded polypropylene resin particle would not be destroyed. Then, a cross section of the expanded polypropylene resin particle thus cut was observed by use of a microscope (manufactured by Keyence Corporation: VHX digital microscope).

On a photograph captured by the microscope so as to observe the expanded polypropylene resin particle, a line segment having a length equivalent to 1000 μm was drawn on an entire portion, except a portion of a surface layer, of the expanded polypropylene resin particle. Then, the number (n) of cells through which the line segment passes was counted, so that a cell diameter was calculated by 1000/n (μm).

Such operations as described above were carried out with respect to each of 10 expanded particles, and an average value of respective calculated cell diameters of the 10 expanded particles was regarded as an average cell diameter of the expanded polypropylene resin particles.

(Calculation of First High Temperature Heat Quantity Ratio of Expanded Polypropylene Resin Particles)

A first high temperature heat quantity ratio [={Qh/(Ql+Qh)}×100(%)] was calculated based on a DSC curve of a first temperature increase (see FIG. 2), which DSC curve was obtained by using a differential scanning calorimeter (manufactured by Seiko Instruments Inc., model: DSC6200) and heating 5 mg to 6 mg of the expanded polypropylene resin particles from 40° C. to 220° C. at a temperature increase rate of 10° C./min.

As illustrated in FIG. 2, in the obtained DSC curve, the entire melting heat quantity (Q=Ql+Qh), which is a sum of Ql and Qh, is indicated by a part surrounded by (i) a line segment A-B that is drawn so as to connect (a) a heat absorption quantity (point A) at a temperature of 80° C. and (b) a heat absorption quantity (point B) at a temperature at which melting on a high temperature side ends and (ii) the DSC curve.

Assuming that (i) a point C is a point at which a heat absorption quantity between (a) the main endothermic peak in the DSC curve and (b) a high temperature side endothermic peak closest to the main endothermic peak is the smallest and (ii) a point D is a point at which the line segment A-B intersects a line that is drawn so as to extend, in parallel with a Y-axis, from the point C to the line segment A-B, Ql is indicated by a part surrounded by a line segment A-D, a line segment C-D, and the DSC curve, and Qh is indicated by a part surrounded by a line segment B-D, the line segment C-D, and the DSC curve.

(DSC Measurement of Expanded Polypropylene Resin Particles at Temperature Increase Rate of 2° C./Min)

DSC measurement was carried out by use of a differential scanning calorimeter (manufactured by Seiko Instruments Inc., model: DSC6200) by heating 1 mg to 3 mg of expanded polypropylene resin particles from 40° C. to 200° C. at a temperature increase rate of 2° C./min.

(Moldability Evaluation)

A polyolefin foaming molding machine (manufactured by DAISEN Co., Ltd., KD-345) was used to (i) fill a mold, which allows a plate-like in-mold expanded molded product having a length of 300 mm, a width of 400 mm, and a thickness of 50 mm to be obtained, with expanded particles which had been adjusted in advance so that expanded polypropylene resin particles would have an internal air pressure shown in Table 2 or Table 3, the mold having been filled with the expanded particles so that cracking of 5 mm occurred therein and (ii) heat mold the expanded particles by compressing the expanded particles by 10% in a direction in which a thickness of the mold extends. A plate-like in-mold expanded molded product having a length of 300 mm, a width of 400 mm, and a thickness of 50 mm were thus obtained.

In this case, after the mold, which is composed of a fixed mold and a movable mold, was filled with the expanded polypropylene resin particles, whose internal pressure had been adjusted, and then the mold was completely closed, air in the mold was expelled first by use of steam having a pressure of 0.1 MPa (gauge pressure) (a preheating step). Thereafter, air was expelled by letting steam flow from the fixed mold side to the movable mold side, and the expanded polypropylene resin particles were heated (a one side heating step). Subsequently, air was further expelled by letting steam flow from the movable mold side to the fixed mold side, and the expanded polypropylene resin particles were heated (an opposite side heating step). Then, the expanded polypropylene resin particles were heat molded for 10 seconds by use of heating steam having a given molding pressure (a both side heating step). An in-mold expanded molded product was thus obtained. Note here that the preheating step was carried out for 3 seconds, the one side heating step was carried out for 7 seconds, the opposite side heating step was carried out for 5 seconds, and the both side heating step was carried out for 10 seconds as described above.

The obtained polypropylene resin in-mold expanded molded product was (i) left at a room temperature for 1 hour, (ii) cured and dried in a thermostatic chamber at 75° C. for 3 hours, and (iii) extracted again and left at the room temperature for 24 hours. Then, fusibility and a surface property of the polypropylene resin in-mold expanded molded product were evaluated.

Note that during in-mold foaming molding, polypropylene resin in-mold expanded molded products were molded at respective molding pressures obtained by changing the molding pressure (steam pressure) during the both side heating step in increments of 0.01 MPa from 0.10 MPa (gauge pressure). The lowest molding pressure, at which an in-mold expanded molded product whose fusibility was evaluated as "good" or "excellent" in fusibility evaluation (see below) was obtained, was regarded as a minimum molding pressure. An in-mold expanded molded product molded at the minimum molding pressure was subjected to (i) surface appearance evaluation, (ii) molded product density measurement, and (iii) 50%-strained compressive strength measurement.

<Fusibility>

The obtained in-mold expanded molded product was (i) notched by 5 mm by use of a cutter in a direction in which a thickness of the in-mold expanded molded product extends and (ii) cleaved by hand. A cleaved surface was visually observed, and a percentage of clefts generated not in interfaces between expanded particles but in the expanded particles was found. Then, fusibility of the in-mold expanded molded product was determined by the following criteria.

Excellent: The percentage of the clefts in the expanded particles was not less than 80%.

Good: The percentage of the clefts in the expanded particles was not less than 60% and less than 80%.

Failed: The percentage of the clefts in the expanded particles was less than 60% (fusibility was so low that the percentage of the clefts appearing in the interfaces between the expanded particles on the cleaved surface was more than 40%).

<Surface Appearance>

A surface having a length of 300 mm and a width of 400 mm of the obtained in-mold expanded molded product was visually observed, and a surface property of the in-mold expanded molded product was determined by the following criteria.

Surface Part

Excellent (E): Few inter-particle spaces (spaces between expanded polypropylene resin particles) were observed, no noticeable surface unevenness was observed, and neither wrinkles nor shrinkage was observed and thus the surface was beautiful.

Good (G): Some inter-particle spaces, surface unevenness, shrinkage, or wrinkles was/were observed.

Failed (F): Inter-particle spaces, surface unevenness, shrinkage, or wrinkles was/were noticeable throughout the surface observed.

Edge Part

Excellent (E): An edge part (ridge part), at which two surfaces of the in-mold expanded molded product intersect, had a clear ridge while having no unevenness derived from the expanded polypropylene resin particles, and thus mold transferability was good. Even in a case where the edge part was rubbed with a finger, the expanded particles would not be peeled off.

Failed (F): The edge part (ridge part) had noticeable unevenness derived from the expanded polypropylene resin particles, and thus mold transferability was poor. In a case where the edge part was rubbed with a finger, the expanded particles were easily peeled off.

(Molded Product Density)

A test piece having a length of 50 mm, a width of 50 mm, and a thickness of 25 mm was cut out from a substantially central part of the obtained in-mold expanded molded product. Note, however, that the test piece having a thickness of 25 mm was obtained from the obtained in-mold expanded molded product by (i) cutting off a first part, including a first (front or upper) surface, by approximately 12.5 mm in a direction in which a thickness of the in-mold expanded molded product extends and (ii) cutting off a second part, including a second (back or lower) surface, by approximately 12.5 mm in the direction in which the thickness of the in-mold expanded molded product extends, the first surface and the second surface facing each other in the direction in which the thickness of the in-mold expanded molded product extends.

A weight W (g) of the test piece was measured, and the length, the width, and the thickness of the test piece were measured by use of a caliper, so that a volume V ($cm^3$) of the test piece was calculated. Then, a molded product density was found by W/V. Note, however, that the molded product density found by W/V was subjected to conversion so as to be expressed in g/L units.

(50%-Strained Compressive Strength)

The test piece, whose molded product density had been measured, was subjected to compressive strength measurement in which a compressive stress of the test piece which was being compressed by 50% at a rate of 10 mm/min was measured by use of a tension and compression testing machine (manufactured by Minebea Co., Ltd., TG series) in conformity with NDS-Z0504.

Examples 1 Through 14 and Comparative Examples 1 Through 10

[Production of Polypropylene Resin Particles]

Polypropylene resins and additives were mixed, by use of a blender, in amounts shown in Table 2 or Table 3.

A twin-screw extruder (manufactured by O. N. Machinery Co., Ltd., TEK45) was used to melt and knead each of obtained mixtures at a resin temperature of 220° C. and extrude each of the mixtures in a form of a strand. The strand thus extruded was water-cooled in a water tank having a length of 2 m, and then was cut, so that polypropylene resin particles (1.2 mg per particle) were produced.

[Production of First-Stage Expanded Particles]

In a pressure-resistant vessel having an internal capacity of 10 L, 100 parts by weight of the obtained polypropylene resin particles, 300 parts by weight of water, 1.5 parts by weight of powdery basic tribasic calcium phosphate as a dispersing agent, 0.06 parts by weight of n-paraffin sulfonic acid soda as a dispersion auxiliary agent, and 7.5 parts by weight of carbon dioxide as a foaming agent were placed. A resultant mixture, which was being stirred, was heated to a foaming temperature shown in a corresponding part of Table 2 or Table 3, and the mixture was retained at the foaming temperature for 10 minutes. Then, carbon dioxide was additionally injected so that a foaming pressure was adjusted to a value shown in a corresponding part of Table 2 or Table 3. Then, the foaming pressure was retained for 30 minutes.

Then, while the temperature and the pressure in the pressure-resistant vessel, into which carbon dioxide was being injected, were retained at respective constant levels, a valve at a lower part of the pressure-resistant vessel was opened so as to release an aqueous dispersion medium into air under atmospheric pressure via an orifice plate having an opening diameter of 3.6 mm. Expanded polypropylene resin particles (first-stage expanded particles) were thus obtained.

A first high temperature heat quantity ratio, a cell diameter, and an expansion ratio of the obtained first-stage expanded particles were measured. Table 2 or Table 3 shows results of the measurement.

The expanded polypropylene resin particles were subjected to DSC measurement at a temperature increase rate of 10° C./min or 2° C./min. As a result, in each of Examples 1 through 14 and Comparative Examples 1 through 10, a DSC curve of a first temperature increase showed (i) one main endothermic peak and (ii) one high temperature peak on a high temperature side of the main endothermic peak.

[Production of Second-Stage Expanded Particles]

The first-stage expanded particles which had been obtained in Examples 13 and 14, Comparative Examples 1, 2, 3, and 5 and whose expansion ratio was 14 times were dried at 80° C. for 6 hours. Thereafter, the first-stage expanded particles were impregnated with pressurized air in the pressure-resistant vessel so that the pressure-resistant vessel had an internal pressure of 0.21 MPa (absolute pressure). Then, the first-stage expanded particles were subjected to second-stage foaming by being brought into contact with steam having a pressure of 0.04 MPa (gauge pressure). Second-stage expanded particles thus obtained had an expansion ratio of 20 times. The second-stage expanded particles were also subjected to DSC measurement. As a result, a DSC curve of a first temperature increase showed (i) one main endothermic peak and (ii) one high temperature peak on a high temperature side of the main endothermic peak. An apex temperature of the main endothermic peak of the second-stage expanded particles was identical to that of corresponding first-stage expanded particles. Note, however, that a shoulder, which was estimated to be derived from heating during second-stage foaming, appeared around 110° C. in the DSC curve.

[Production of in-Mold Expanded Molded Product]

The obtained first-stage expanded particles (in Examples 13 and 14, and Comparative Examples 1, 2, 3, and 5, second-stage expanded particles) were used to obtain in-mold expanded molded products under conditions described in (Moldability evaluation).

Table 2 and Table 3 show results of moldability evaluation, molded product density measurement, and 50%-strained compressive strength measurement.

TABLE 2

| | | | | Example | | | | | | |
|---|---|---|---|---|---|---|---|---|---|---|
| | | | | 1 | 2 | 3 | 4 | 5 | 6 | 7 |
| Base material resin | Polypropylene resin A | Polypropylene resin A-1 | Part by weight | 60 | | | | 60 | 50 | 40 |
| | | Polypropylene resin A-2 | Part by weight | | 60 | | | | | |
| | | Polypropylene resin A-3 | Part by weight | | | 60 | | | | |
| | | Polypropylene resin A-4 | Part by weight | | | | 60 | | | |
| | | Polypropylene resin A-5 | Part by weight | | | | | | | |
| | | Polypropylene resin A-6 | Part by weight | | | | | | | |
| | Polypropylene resin B | Polypropylene resin B-1 | Part by weight | 40 | 40 | 40 | 40 | | 50 | 60 |
| | | Polypropylene resin B-2 | Part by weight | | | | | 40 | | |
| | | Polypropylene resin B-3 | Part by weight | | | | | | | |
| | | Polypropylene resin B-4 | Part by weight | | | | | | | |
| | | Polypropylene resin B-5 | Part by weight | | | | | | | |
| | Other Polypropylene resin | Polypropylene resin C | Part by weight | | | | | | | |
| | | Polypropylene resin D | Part by weight | | | | | | | |
| | Additive | High-density polyethylene resin | Part by weight | 5 | 5 | 5 | 5 | | 5 | |
| | | Talc | Part by weight | 0.05 | 0.05 | 0.05 | 0.05 | 0.05 | 0.05 | 0.05 |
| | | Polyethylene glycol | Part by weight | 0.5 | 0.5 | 0.5 | 0.5 | 0.5 | 0.5 | 0.5 |
| | | Carbon black | Part by weight | | | | | | | |

TABLE 2-continued

|  |  |  | | | | | | | | |
|---|---|---|---|---|---|---|---|---|---|---|
| | Physical property | Flexural modulus | MPa | 990 | 960 | 980 | 1010 | 980 | 1040 | 1080 |
| | | Satisfaction of Expression (1) | — | E* | E* | E* | E* | E* | E* | E* |

*E is an abbreviation for "Excellent".

| | | | | Example | | | | | | |
|---|---|---|---|---|---|---|---|---|---|---|
| | | | | 8 | 9 | 10 | 11 | 12 | 13 | 14 |
| Base material resin | Polypropylene resin A | Polypropylene resin A-1 | Part by weight | 70 | 80 | 60 | 60 | 60 | 40 | |
| | | Polypropylene resin A-2 | Part by weight | | | | | | | |
| | | Polypropylene resin A-3 | Part by weight | | | | | | | |
| | | Polypropylene resin A-4 | Part by weight | | | | | | | |
| | | Polypropylene resin A-5 | Part by weight | | | | | | | 100 |
| | | Polypropylene resin A-6 | Part by weight | | | | | | | |
| | Polypropylene resin B | Polypropylene resin B-1 | Part by weight | 30 | 20 | 40 | 40 | 40 | 60 | |
| | | Polypropylene resin B-2 | Part by weight | | | | | | | |
| | | Polypropylene resin B-3 | Part by weight | | | | | | | |
| | | Polypropylene resin B-4 | Part by weight | | | | | | | |
| | | Polypropylene resin B-5 | Part by weight | | | | | | | |
| | Other Polypropylene resin | Polypropylene resin C | Part by weight | | | | | | | |
| | | Polypropylene resin D | Part by weight | | | | | | | |
| | Additive | High-density polyethylene resin | Part by weight | 5 | 5 | 5 | 5 | 5 | | |
| | | Talc | Part by weight | 0.05 | 0.05 | 0.05 | 0.05 | 0.05 | 0.05 | 0.05 |
| | | Polyethylene glycol | Part by weight | 0.5 | 0.5 | 0.5 | 0.5 | 0.5 | 0.5 | 0.5 |
| | | Carbon black | Part by weight | | | | 6 | | | |
| | Physical property | Flexural modulus | MPa | 940 | 890 | 1000 | 990 | 990 | 1080 | 1000 |
| | | Satisfaction of Expression (1) | — | E* | E* | E* | E* | E* | E* | E* |

*E is an abbreviation for "Excellent".

| | | | | Example | | | | | | |
|---|---|---|---|---|---|---|---|---|---|---|
| | | | | 1 | 2 | 3 | 4 | 5 | 6 | 7 |
| First-stage foaming | Foaming condition | Carbon dioxide content | Part by weight | 7.5 | 7.5 | 7.5 | 7.5 | 7.5 | 7.5 | 7.5 |
| | | Foaming temperature | ° C. | 148 | 148 | 148 | 149 | 148 | 148 | 149 |
| | | Foaming pressure (gauge pressure) | MPa | 3.3 | 3.3 | 3.3 | 3.3 | 3.3 | 3.3 | 3.3 |
| | | Low pressure region temperature | ° C. | 100 | 100 | 100 | 100 | 100 | 100 | 100 |
| | Physical property | Melting point | ° C. | 145.7 | 145.5 | 146.1 | 146.8 | 146.4 | 146.6 | 147.5 |
| | | Second high temperature heat quantity ratio | % | 18 | 19 | 19 | 19 | 18 | 17 | 15 |
| | | Main endothermic peak apex temperature | ° C. | 139.5 | 139.2 | 139.6 | 141.1 | 139.5 | 141.1 | 141.7 |
| | | Temperature difference between melting point and main endothermic peak apex temperature | ° C. | 6.2 | 6.3 | 6.5 | 5.7 | 6.9 | 5.5 | 5.8 |
| | | First high temperature heat quantity ratio | % | 22 | 22 | 21 | 21 | 22 | 22 | 21 |
| | | Average cell diameter | μm | 180 | 180 | 180 | 160 | 170 | 180 | 170 |
| | | Expansion ratio | Time | 19 | 20 | 19 | 19 | 19 | 19 | 19 |
| Second-stage foaming | Foaming condition | Internal pressure (absolute pressure) | MPa | — | — | — | — | — | — | — |
| | Physical property | Melting point | ° C. | — | — | — | — | — | — | — |
| | | Second high temperature heat | % | — | — | — | — | — | — | — |

TABLE 2-continued

|  |  |  |  | Example |  |  |  |  |  |  |
|---|---|---|---|---|---|---|---|---|---|---|
|  |  |  |  |  |  |  |  |  |  |  |
|  |  | quantity ratio |  |  |  |  |  |  |  |  |
|  |  | Main endothermic peak apex temperature | ° C | — | — | — | — | — | — | — |
|  |  | Temperature difference between melting point and main endothermic peak apex temperature | ° C. | — | — | — | — | — | — | — |
|  |  | First high temperature heat quantity ratio | % | — | — | — | — | — | — | — |
|  |  | Average cell diameter | μm | — | — | — | — | — | — | — |
|  |  | Expansion ratio | Time | — | — | — | — | — | — | — |

|  |  |  |  | Example |  |  |  |  |  |  |
|---|---|---|---|---|---|---|---|---|---|---|
|  |  |  |  | 8 | 9 | 10 | 11 | 12 | 13 | 14 |
| First-stage foaming | Foaming condition | Carbon dioxide content | Part by weight | 7.5 | 7.5 | 7.5 | 7.5 | 7.5 | 7.5 | 7.5 |
|  |  | Foaming temperature | ° C. | 145 | 143 | 148 | 149 | 146 | 149 | 148 |
|  |  | Foaming pressure (gauge pressure) | MPa | 3.3 | 3.3 | 3.3 | 3.3 | 3.3 | 3.3 | 3.3 |
|  |  | Low pressure region temperature | ° C. | 100 | 100 | 100 | 100 | 100 | 15 | 15 |
|  | Physical property | Melting point | ° C. | 143.5 | 141.5 | 145.8 | 145.7 | 145.7 | 147.5 | 145.1 |
|  |  | Second high temperature heat quantity ratio | % | 19 | 18 | 18 | 18 | 18 | 15 | 18 |
|  |  | Main endothermic peak apex temperature | ° C. | 136.9 | 136.4 | 139.5 | 140.0 | 138.9 | 141.2 | 140.1 |
|  |  | Temperature difference between melting point and main endothermic peak apex temperature | ° C. | 6.6 | 5.1 | 6.3 | 5.7 | 6.8 | 6.3 | 5.0 |
|  |  | First high temperature heat quantity ratio | % | 22 | 21 | 22 | 16 | 27 | 21 | 22 |
|  |  | Average cell diameter | μm | 180 | 190 | 130 | 220 | 150 | 120 | 120 |
|  |  | Expansion ratio | Time | 20 | 20 | 21 | 23 | 15 | 14 | 14 |
| Second-stage foaming | Foaming condition | Internal pressure (absolute pressure) | MPa | — | — | — | — | — | 0.21 | 0.21 |
|  | Physical property | Melting point | ° C. | — | — | — | — | — | 147.5 | 145.1 |
|  |  | Second high temperature heat quantity ratio | % | — | — | — | — | — | 16 | 18 |
|  |  | Main endothermic peak apex temperature | ° C. | — | — | — | — | — | 141.2 | 140.1 |
|  |  | Temperature difference between melting point and main endothermic peak apex temperature | ° C. | — | — | — | — | — | 6.3 | 5.0 |
|  |  | First high temperature heat quantity ratio | % | — | — | — | — | — | 21 | 22 |
|  |  | Average cell diameter | μm | — | — | — | — | — | 170 | 170 |
|  |  | Expansion ratio | Time | — | — | — | — | — | 20 | 20 |

|  |  |  |  | Example |  |  |  |  |  |  |
|---|---|---|---|---|---|---|---|---|---|---|
|  |  |  |  | 1 | 2 | 3 | 4 | 5 | 6 | 7 |
| In-mold expanded molded product | Moldability | Internal pressure (absolute pressure) of expanded particles | MPa | 0.2 | 0.2 | 0.2 | 0.2 | 0.2 | 0.2 | 0.2 |
|  |  | Minimum molding pressure (gauge pressure) | MPa | 0.20 | 0.20 | 0.20 | 0.21 | 0.20 | 0.20 | 0.21 |
|  |  | Surface appearance — Surface part | — | E*1 | E*1 | E*1 | E*1 | E*1 | E*1 | G*2 |
|  |  | Surface appearance — Edge part | — | E*1 | E*1 | E*1 | E*1 | E*1 | E*1 | E*1 |
|  | Physical property | Molded product density | g/L | 30 | 30 | 30 | 30 | 30 | 30 | 30 |
|  |  | 50%-strained compressive strength | MPa | 0.23 | 0.23 | 0.23 | 0.23 | 0.23 | 0.23 | 0.24 |

*1 E is an abbreviation for "Excellent".
*2 G is an abbreviation for "Good".

|  |  |  |  | Example |  |  |  |  |  |  |
|---|---|---|---|---|---|---|---|---|---|---|
|  |  |  |  | 8 | 9 | 10 | 11 | 12 | 13 | 14 |
| In-mold expanded molded | Moldability | Internal pressure (absolute pressure) of expanded particles | MPa | 0.2 | 0.2 | 0.2 | 0.2 | 0.2 | 0.2 | 0.2 |

TABLE 2-continued

| product | | Minimum molding pressure (gauge pressure) | MPa | 0.20 | 0.19 | 0.20 | 0.20 | 0.20 | 0.21 | 0.22 |
|---|---|---|---|---|---|---|---|---|---|---|
| | Surface appearance | Surface part | — | E* | E* | E* | E* | E* | E* | E* |
| | | Edge part | — | E* | E* | E* | E* | E* | E* | E* |
| Physical property | Molded product density | | g/L | 29 | 30 | 29 | 25 | 40 | 30 | 30 |
| | 50%-strained compressive strength | | MPa | 0.23 | 0.21 | 0.23 | 0.20 | 0.33 | 0.24 | 0.23 |

*E is an abbreviation for "Excellent".

TABLE 3

| | | | | Comparative Example | | | | |
|---|---|---|---|---|---|---|---|---|
| | | | | 1 | 2 | 3 | 4 | 5 |
| Base material resin | Polypropylene resin A | Polypropylene resin A-1 | Part by weight | | | | 60 | 100 |
| | | Polypropylene resin A-2 | Part by weight | | | | | |
| | | Polypropylene resin A-3 | Part by weight | | | | | |
| | | Polypropylene resin A-4 | Part by weight | | | | | |
| | | Polypropylene resin A-5 | Part by weight | | | | | |
| | | Polypropylene resin A-6 | Part by weight | | 100 | | | |
| | Polypropylene resin B | Polypropylene resin B-1 | Part by weight | | | | | |
| | | Polypropylene resin B-2 | Part by weight | | | | | |
| | | Polypropylene resin B-3 | Part by weight | 100 | | | 410 | |
| | | Polypropylene resin B-4 | Part by weight | | | | | |
| | | Polypropylene resin B-5 | Part by weight | | | | | |
| Other Polypropylene resin | | Polypropylene resin C | Part by weight | | | 100 | | |
| | | Polypropylene resin D | Part by weight | | | | | |
| Additive | | High-density polyethylene resin | Part by weight | | | | | |
| | | Talc | Part by weight | 0.05 | 0.05 | 0.05 | 0.05 | 0.05 |
| | | Polyethylene glycol | Part by weight | 0.5 | 0.5 | 0.5 | 0.5 | 0.5 |
| | | Carbon black | Part by weight | | | | | |
| Physical property | Flexural modulus | | MPa | 1070 | 660 | 720 | 890 | 770 |
| | Satisfaction of Expression (1) | | — | F* | F* | F* | F* | F* |

*F is an abbreviation for "Failed".

| | | | | Comparative Example | | | | |
|---|---|---|---|---|---|---|---|---|
| | | | | 6 | 7 | 8 | 9 | 10 |
| Base material resin | Polypropylene resin A | Polypropylene resin A-1 | Part by weight | 30 | | | | |
| | | Polypropylene resin A-2 | Part by weight | | | | | |
| | | Polypropylene resin A-3 | Part by weight | | | | | |
| | | Polypropylene resin A-4 | Part by weight | | | | | |
| | | Polypropylene resin A-5 | Part by weight | | | 100 | 90 | |
| | | Polypropylene resin A-6 | Part by weight | | | | | |
| | Polypropylene resin B | Polypropylene resin B-1 | Part by weight | 70 | | | | |
| | | Polypropylene resin B-2 | Part by weight | | | | | |

TABLE 3-continued

|  |  |  | | | | | | |
|---|---|---|---|---|---|---|---|---|
| | | Polypropylene resin B-3 | Part by weight | | | | | |
| | | Polypropylene resin B-4 | Part by weight | | | 100 | | |
| | | Polypropylene resin B-5 | Part by weight | | | | 10 | |
| Other Polypropylene resin | | Polypropylene resin C | Part by weight | | | | | |
| | | Polypropylene resin D | Part by weight | | | | | 100 |
| Additive | | High-density polyethylene resin | Part by weight | 5 | | | | |
| | | Talc | Part by weight | 0.05 | 0.05 | 0.05 | 0.05 | 0.05 |
| | | Polyethylene glycol | Part by weight | 0.5 | 0.5 | 0.5 | 0.5 | 0.5 |
| | | Carbon black | Part by weight | | | | | |
| Physical property | | Flexural modulus | MPa | 1160 | 1000 | 680 | 1070 | 850 |
| | | Satisfaction of Expression (1) | — | F*1 | E*2 | E*2 | E*2 | E*2 |

*1 F is an abbreviation for "Failed".
*2 E is an abbreviation for "Excellent".

|  |  |  |  | Comparative Example | | | | |
|---|---|---|---|---|---|---|---|---|
| | | | | 1 | 2 | 3 | 4 | 5 |
| First-stage foaming | Foaming condition | Carbon dioxide content | Part by weight | 7.5 | 7.5 | 7.5 | 7.5 | 7.5 |
| | | Foaming temperature | °C. | 146 | 132 | 128 | 143 | 137 |
| | | Foaming pressure (gauge pressure) | MPa | 3.3 | 3.3 | 3.5 | 3.3 | 3.3 |
| | | Low pressure region temperature | °C. | 15 | 100 | 100 | 100 | 100 |
| | Physical property | Melting point | °C. | 145.4 | 132.4 | 124.9 | 140.0 | 134.0 |
| | | Second high temperature heat quantity ratio | % | 19 | 25 | 14 | 19 | 19 |
| | | Main endothermic peak apex temperature | °C. | 140.8 | 130.1 | 120.1 | 136.1 | 132.0 |
| | | Temperature difference between melting point and main endothermic peak apex temperature | °C. | 4.6 | 2.3 | 4.8 | 3.9 | 2.0 |
| | | First high temperature heat quantity ratio | % | 22 | 21 | 21 | 21 | 22 |
| | | Average cell diameter | μm | 120 | 130 | 120 | 180 | 120 |
| | | Expansion ratio | Time | 14 | 14 | 14 | 19 | 14 |
| Second-stage foaming | Foaming condition | Internal pressure (absolute pressure) | MPa | 0.21 | 0.21 | 0.21 | — | 0.21 |
| | Physical property | Melting point | °C. | 145.4 | 132.4 | 124.9 | — | 134.0 |
| | | Second high temperature heat quantity ratio | % | 19 | 25 | 14 | — | 19 |
| | | Main endothermic peak apex temperature | °C. | 140.8 | 130.1 | 120.1 | — | 132.0 |
| | | Temperature difference between melting point and main endothermic peak apex temperature | °C. | 4.6 | 2.3 | 4.8 | — | 2.0 |
| | | First high temperature heat quantity ratio | % | 22 | 21 | 21 | — | 22 |
| | | Average cell diameter | μm | 180 | 190 | 170 | — | 180 |
| | | Expansion ratio | Time | 20 | 20 | 20 | — | 20 |

|  |  |  |  | Comparative Example | | | | |
|---|---|---|---|---|---|---|---|---|
| | | | | 6 | 7 | 8 | 9 | 10 |
| First-stage foaming | Foaming condition | Carbon dioxide content | Part by weight | 7.5 | 7.5 | 7.5 | 7.5 | 7.5 |
| | | Foaming temperature | °C. | 149 | 148 | 145 | 148 | 144 |
| | | Foaming pressure (gauge pressure) | MPa | 3.3 | 3.3 | 3.5 | 3.4 | 3.4 |
| | | Low pressure region temperature | °C. | 100 | 100 | 100 | 100 | 100 |

TABLE 3-continued

|  |  |  |  |  |  |  |  |  |
|---|---|---|---|---|---|---|---|---|
|  | Physical property | Melting point | °C. | 147.4 | 145.1 | 136.1 | 147.2 | 141.5 |
|  |  | Second high temperature heat quantity ratio | % | 15 | 18 | 19 | 19 | 22 |
|  |  | Main endothermic peak apex temperature | °C. | 142.5 | 141.7 | 128.2 | 145.2 | 135.2 |
|  |  | Temperature difference between melting point and main endothermic peak apex temperature | °C. | 4.9 | 3.4 | 7.9 | 2.0 | 6.3 |
|  |  | First high temperature heat quantity ratio | % | 21 | 22 | 21 | 23 | 23 |
|  |  | Average cell diameter | μm | 160 | 180 | 190 | 160 | 150 |
|  |  | Expansion ratio | Time | 19 | 19 | 19 | 19 | 19 |
| Second-stage foaming | Foaming condition | Internal pressure (absolute pressure) | MPa | — | — | — | — | — |
|  | Physical property | Melting point | °C. | — | — | — | — | — |
|  |  | Second high temperature heat quantity ratio | % | — | — | — | — | — |
|  |  | Main endothermic peak apex temperature | °C. | — | — | — | — | — |
|  |  | Temperature difference between melting point and main endothermic peak apex temperature | °C. | — | — | — | — | — |
|  |  | First high temperature heat quantity ratio | % | — | — | — | — | — |
|  |  | Average cell diameter | μm | — | — | — | — | — |
|  |  | Expansion ratio | Time | — | — | — | — | — |

|  |  |  |  | Comparative Example | | | | |
|---|---|---|---|---|---|---|---|---|
|  |  |  |  | 1 | 2 | 3 | 4 | 5 |
| In-mold expanded molded product | Moldabilily | Internal pressure (absolute pressure) of expanded particles | MPa | 0.2 | 0.2 | 0.2 | 0.2 | 0.2 |
|  |  | Minimum molding pressure (gauge pressure) | MPa | 0.20 | 0.16 | 0.14 | 0.20 | 0.48 |
|  |  | Surface appearance Surface part | — | E*1 | G*2 | G*2 | E*1 | E*1 |
|  |  | Edge part | — | E*1 | E*1 | E*1 | E*1 | E*1 |
|  | Physical property | Molded product density | g/L | 30 | 30 | 30 | 30 | 30 |
|  |  | 50%-strained compressive strength | MPa | 0.23 | 0.19 | 0.18 | 0.20 | 0.20 |

*1 E is an abbreviation for "Excellent".
*2 G is an abbreviation for "Good".

|  |  |  |  | Comparative Example | | | | |
|---|---|---|---|---|---|---|---|---|
|  |  |  |  | 6 | 7 | 8 | 9 | 10 |
| In-mold expanded molded product | Moldabilily | Internal pressure (absolute pressure) of expanded particles | MPa | 0.2 | 0.2 | 0.2 | 0.2 | 0.2 |
|  |  | Minimum molding pressure (gauge pressure) | MPa | 0.23 | 0.25 | 0.20 | 0.27 | 0.20 |
|  |  | Surface appearance Surface part | — | F*1 | G*2 | E*3 | F*1 | F*1 |
|  |  | Edge part | — | F*1 | E*3 | E*3 | F*1 | F*1 |
|  | Physical property | Molded product density | g/L | 30 | 30 | 30 | 30 | 30 |
|  |  | 50%-strained compressive strength | MPa | 0.24 | 0.23 | 0.19 | 0.25 | 0.21 |

*1 F is an abbreviation for "Failed".
*2 G is an abbreviation for "Good".
*3 E is an abbreviation for "Excellent."

A comparison among in-mold expanded molded products having substantially identical molded product densities reveals (i) that in Examples, the in-mold expanded molded products can be molded at a low molding pressure and display a high 50%-strained compressive strength and (ii) that in Comparative Examples, the in-mold expanded molded products which can be molded at a low molding pressure have a lower 50%-strained compressive strength, and the in-mold expanded molded products which are intended to have a higher 50%-strained compressive strength result in a higher molding pressure.

Further, a comparison between (a) Examples 1 through 14 and (b) Comparative Example 10 reveals that Comparative Example 10, whose temperature difference between a melting point and a main endothermic peak apex temperature is subequal to that of any one of Examples 1 through 14 and which has a second high temperature heat quantity ratio of not less than 20%, causes a deterioration in moldability of an in-mold expanded molded product to be obtained.

Expanded polypropylene resin particles of one or more embodiments of the present invention make it possible to keep a molding temperature (steam pressure) during in-mold foaming molding low. Further, the expanded polypropylene resin particles of one or more embodiments of the present invention can be used to produce a polypropylene resin in-mold expanded molded product whose compressive strength is maintained at a level not inferior to those of conventional molded products and which is excellent in surface property (beautiful in surface appearance).

REFERENCE SIGNS LIST tm Temperature of polypropylene resin-derived melting peak in DSC curve of second temperature increase of expanded polypropylene resin particles (=melting point)
Point a Heat absorption quantity at 80° C. in DSC curve of second temperature increase of expanded polypropylene resin particles
Point b Heat absorption quantity at temperature, at which melting on high temperature side ends, in DSC curve of second temperature increase of expanded polypropylene resin particles
Point c Apex of polypropylene resin-derived melting peak in DSC curve of second temperature increase of expanded polypropylene resin particles (=tm)
Point d Point, at which line segment a-b intersects line that is drawn so as to extend, in parallel with Y-axis, from point c to line segment a-b, in DSC curve of second temperature increase of expanded polypropylene resin particles
Point A Heat absorption quantity at 80° C. in DSC curve of first temperature increase of expanded polypropylene resin particles
Point B Heat absorption quantity at temperature, at which melting on high temperature side ends, in DSC curve of first temperature increase of expanded polypropylene resin particles
Point C Point, at which heat absorption quantity becomes the smallest between main endothermic peak and high temperature side endothermic peak closest to main endothermic peak, in DSC curve of first temperature increase of expanded polypropylene resin particles
Point D Point, at which line segment A-B intersects line that is drawn so as to extend, in parallel with Y-axis, from point C to line segment A-B, in DSC curve of first temperature increase of expanded polypropylene resin particles
Qh Melting heat quantity of endothermic peak on high temperature side of main endothermic peak in DSC curve of first temperature increase of expanded polypropylene resin particles
Ql Melting heat quantity of main endothermic peak in DSC curve of first temperature increase of expanded polypropylene resin particles Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. Expanded polypropylene resin particles comprising a polypropylene resin as a base material resin,
wherein the polypropylene resin has a flexural modulus of 750 MPa to 1100 MPa,
wherein the flexural modulus and a melting point of the expanded polypropylene resin particles satisfy Expression (1):

[Flexural modulus (MPa)]<31.19×[Melting point (° C.)]−3500 wherein the melting point of the expanded polypropylene resin particles is a melting point of 141.5° C. to 150.0° C. in a second differential scanning calorimetry (DSC) curve of a second temperature increase and the expanded polypropylene resin particles have a high temperature melting heat quantity ratio [(j/J)×100(%)] of 15% to less than 20% in the second DSC curve; or the melting point of the expanded polypropylene resin particles is a melting point of higher than 145.0° C. to 150.0° C. in the second DSC curve,
wherein the second DSC curve is obtained when the expanded polypropylene resin particles are heated from 40° C. to 220° C. at a temperature increase rate of 10° C./min in a first temperature increase, then cooled from 220° C. to 40° C. at a temperature decrease rate of 10° C./min, and heated again from 40° C. to 220° C. at a temperature increase rate of 10° C./min in the second temperature increase,
wherein the high temperature melting heat quantity ratio is a ratio of a melting heat quantity (j) from the melting point to a melting end temperature to an entire resin melting heat quantity (J) in the second DSC curve,
wherein the expanded polypropylene resin particles have, in a first DSC curve obtained in the first temperature increase, a main endothermic peak having an apex temperature of 130.0° C. to 145.0° C. and at least one endothermic peak on a high temperature side of the main endothermic peak, and
wherein the melting point in the second DSC curve is 5.0° C. to 15.0° C. higher than the apex temperature of the main endothermic peak in the first DSC curve.

2. The expanded polypropylene resin particles according to claim 1, wherein the melting point of the second DSC curve is higher than 145.0° C. to 150.0° C.

3. The expanded polypropylene resin particles according to claim 1, wherein the melting point in the second DSC curve is 5.5° C. to 10.0° C. higher than the apex temperature of the main endothermic peak in the first DSC curve.

4. The expanded polypropylene resin particles according to claim 3, wherein the melting point in the second DSC curve is 5.5° C. to 8.0° C. higher than the apex temperature of the main endothermic peak in the first DSC curve.

5. The expanded polypropylene resin particles according to claim 1, wherein the apex temperature of the main endothermic peak in the first DSC curve is 133.0° C. to 142.0° C.

6. The expanded polypropylene resin particles according to claim 1, wherein the melting point in the second DSC curve is higher than 145.0° C. to 148.0° C.

7. The expanded polypropylene resin particles according to claim 1, wherein the polypropylene resin has a flexural modulus of 800 MPa to 1050 MPa.

8. The expanded polypropylene resin particles according to claim 1, wherein the base material resin comprises a polyethylene resin in an amount of 1 part by weight to 20 parts by weight with respect to 100 parts by weight of the polypropylene resin.

9. The expanded polypropylene resin particles according to claim 1, wherein the polypropylene resin comprises a first polypropylene resin having a melting point of 130.0° C. to 140.0° C. and a second polypropylene resin having a melting point of 145.0° C. to 165.0° C.

10. The expanded polypropylene resin particles according to claim 9, wherein the polypropylene resin comprises the first polypropylene resin and the second polypropylene resin in a total amount of 100 weight %, wherein the first polypropylene resin accounts for 50 weight % to 70 weight %, and the second polypropylene resin accounts for 30 weight % to 50 weight %.

11. The expanded polypropylene resin particles according to claim 1, wherein a 1-butene-containing structural unit is present, as a comonomer, in an amount of 1 weight % to 15 weight % with respect to 100 weight % of polypropylene resin.

12. The expanded polypropylene resin particles according to claim 1, wherein a 1-butene-containing structural unit is present, as a comonomer, in an amount of 1.5 weight % to 11 weight % with respect to 100 weight % of polypropylene resin.

13. A polypropylene resin in-mold expanded molded product obtained by molding the expanded polypropylene resin particles according to claim 1.

14. The polypropylene resin in-mold expanded molded product according to claim 13, wherein the polypropylene resin in-mold expanded molded product has a molded product density and a 50%-strained compressive strength that satisfy Expression (2):

[50%-strained compressive strength (MPa)]≥0.0069×[Molded product density (g/L)]+0.018.

15. A method for producing expanded polypropylene resin particles, comprising:
  placing in a pressure-resistant vessel a mixture comprising polypropylene resin particles, water, and an inorganic gas foaming agent, the polypropylene resin particles comprising a polypropylene resin as a base material resin;
  dispersing the polypropylene resin particles by stirring the mixture, obtaining a dispersion liquid;
  increasing a temperature and an internal pressure of the pressure-resistant vessel; and
  releasing the dispersion liquid from the pressure-resistant vessel into a pressure region to expand the polypropylene resin particles, the pressure region having a pressure lower than the internal pressure of the pressure-resistant vessel,
  wherein the polypropylene resin has a flexural modulus of 750 MPa to 1100 MPa,
  wherein the flexural modulus and a melting point of the expanded polypropylene resin particles satisfy Expression (1):

[Flexural modulus (MPa)]<31.19×[Melting point (° C.)]−3500 wherein the melting point of the expanded polypropylene resin particles is a melting point of 141.5° C. to 150.0° C. in a second differential scanning calorimetry (DSC) curve of a second temperature increase and the expanded polypropylene resin particles have a high temperature melting heat quantity ratio [(j/J)×100(%)] of 15% to less than 20% in the second DSC curve; or the melting point of the expanded polypropylene resin particles is a melting point of higher than 145.0° C. to 150.0° C. in the second DSC curve,
  wherein the second DSC curve is obtained when the expanded polypropylene resin particles are heated from 40° C. to 220° C. at a temperature increase rate of 10° C./min in a first temperature increase, then cooled from 220° C. to 40° C. at a temperature decrease rate of 10° C./min, and heated again from 40° C. to 220° C. at a temperature increase rate of 10° C./min in the second temperature increase,
  wherein the high temperature melting heat quantity ratio is a ratio of a melting heat quantity (j) from the melting point to a melting end temperature to an entire resin melting heat quantity (J) in the second DSC curve,
  wherein the expanded polypropylene resin particles have, in a first DSC curve obtained in the first temperature increase, a main endothermic peak having an apex temperature of 130.0° C. to 145.0° C. and at least one endothermic peak on a high temperature side of the main endothermic peak, and
  wherein the melting point in the second DSC curve is 5.0° C. to 15.0° C. higher than the apex temperature of the main endothermic peak in the first DSC curve.

16. The method according to claim 15, wherein the releasing is performed at a temperature of the pressure region of not more than 40° C.

17. A method for producing a polypropylene resin in-mold expanded molded product, comprising:
  filling a mold with the expanded polypropylene resin particles obtained by the method according to claim 15; and
  obtaining the polypropylene resin in-mold expanded molded product by heating the expanded polypropylene resin particles in the mold.

18. The method according to claim 17,
  wherein the expanded polypropylene resin particles are heated using steam having a pressure of not more than 0.22 MPa (gauge pressure), and
  wherein the polypropylene resin in-mold expanded molded product has a molded product density and a 50%-strained compressive strength that satisfy Expression (2):

[50%-strained compressive strength (MPa)]≥0.0069×[Molded product density (g/L)]+0.018.

* * * * *